US012776955B2

(12) United States Patent
Shimezawa et al.

(10) Patent No.: US 12,776,955 B2
(45) Date of Patent: Oct. 27, 2026

(54) IN-VEHICLE COMMUNICATION DEVICE, COMMUNICATION METHOD, AND COMMUNICATION SYSTEM

(71) Applicant: Sony Group Corporation, Tokyo (JP)

(72) Inventors: Kazuyuki Shimezawa, Tokyo (JP); Hiromasa Uchiyama, Tokyo (JP); Shigeru Sugaya, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 385 days.

(21) Appl. No.: 18/281,959

(22) PCT Filed: Feb. 2, 2022

(86) PCT No.: PCT/JP2022/003926
§ 371 (c)(1),
(2) Date: Sep. 14, 2023

(87) PCT Pub. No.: WO2022/201885
PCT Pub. Date: Sep. 29, 2022

(65) Prior Publication Data

US 2024/0163175 A1 May 16, 2024

(30) Foreign Application Priority Data

Mar. 25, 2021 (JP) ................................ 2021-051641

(51) Int. Cl.
*H04L 41/12* (2022.01)
*H04L 12/42* (2006.01)
(Continued)

(52) U.S. Cl.
CPC .............. *H04L 41/12* (2013.01); *H04L 12/42* (2013.01); *H04L 41/0663* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 2005/0025163 A1* | 2/2005 | Christie | H04W 40/12 370/401 |
| 2019/0068510 A1 | 2/2019 | Endo | |
| 2019/0385057 A1* | 12/2019 | Litichever | G06N 3/08 |

FOREIGN PATENT DOCUMENTS

| | | |
|---|---|---|
| JP | 2018-006786 A | 1/2018 |
| JP | 2019-047216 A | 3/2019 |

(Continued)

OTHER PUBLICATIONS

Translation of JP2019125344 (Year: 2019).*
(Continued)

*Primary Examiner* — Angela Nguyen
(74) *Attorney, Agent, or Firm* — XSENSUS LLP

(57) ABSTRACT

An in-vehicle communication device includes a wired communication unit, a wireless communication unit, and a control unit. The wired communication unit performs wired communication via a wired communication network constructed between a plurality of pieces of equipment mounted on a vehicle. The wireless communication unit performs wireless communication via a wireless communication network constructed between the plurality of pieces of equipment. The control unit transmits first data via the wired communication unit and transmits second data via the wireless communication unit according to a predetermined condition.

19 Claims, 14 Drawing Sheets

(51) Int. Cl.
*H04L 41/0663* (2022.01)
*H04L 47/125* (2022.01)

(56) References Cited

FOREIGN PATENT DOCUMENTS

| | | | |
|---|---|---|---|
| JP | 2019-125344 | A | 7/2019 |
| JP | 2021-158509 | A | 10/2021 |
| WO | WO-2020228396 | A1 | 11/2020 |

OTHER PUBLICATIONS

Translation of WO202028396 (Year: 2020).*
International Search Report and Written Opinion mailed on Apr. 5, 2022, received for PCT Application PCT/JP2022/003926, filed on Feb. 2, 2022, 10 pages including English Translation.

* cited by examiner

1B

1F

1C

IN-VEHICLE COMMUNICATION DEVICE, COMMUNICATION METHOD, AND COMMUNICATION SYSTEM

CROSS-REFERENCE TO RELATED APPLICATIONS

The present application is based on PCT filing PCT/JP2022/003926, filed Feb. 2, 2022, which claims priority from Japanese Patent Application No. 2021-051641, filed Mar. 25, 2021, the entire contents of each are incorporated herein by reference.

FIELD

The present disclosure relates to an in-vehicle communication device, a communication method, and a communication system.

BACKGROUND

In recent years, efforts for practical application of automatic driving have been actively made. In the automatic driving, an automobile is basically controlled on the basis of data from a sensor or a camera in the vehicle. Thus, in order to perform the automatic driving, communication in the vehicle (intra-vehicle communication) is important. Examples of the intra-vehicle communication include wired communication and wireless communication. In addition, a technology of combining the wired communication and wireless communication is known as the intra-vehicle communication.

CITATION LIST

Patent Literature

Patent Literature 1: Japanese Patent Application Laid-open No. 2018-006786

SUMMARY

Technical Problem

As described above, in automatic driving, since an automobile is controlled on the basis of data from a sensor or a camera in the vehicle, for example, it is required to construct a robust system capable of performing communication even when a failure or unauthorized access from the outside is generated.

Thus, the present disclosure provides a mechanism capable of realizing more robust intra-vehicle communication.

Note that the above problem or object is merely one of a plurality of problems or objects that can be solved or achieved by a plurality of embodiments disclosed in the present specification.

Solution to Problem

According to the present disclosure, an in-vehicle communication device is provided. The in-vehicle communication device includes a wired communication unit, a wireless communication unit, and a control unit. The wired communication unit performs wired communication via a wired communication network constructed between a plurality of pieces of equipment mounted on a vehicle. The wireless communication unit performs wireless communication via a wireless communication network constructed between the plurality of pieces of equipment. The control unit transmits first data via the wired communication unit and transmits second data via the wireless communication unit according to a predetermined condition.

DESCRIPTION OF EMBODIMENTS

Figure 1:
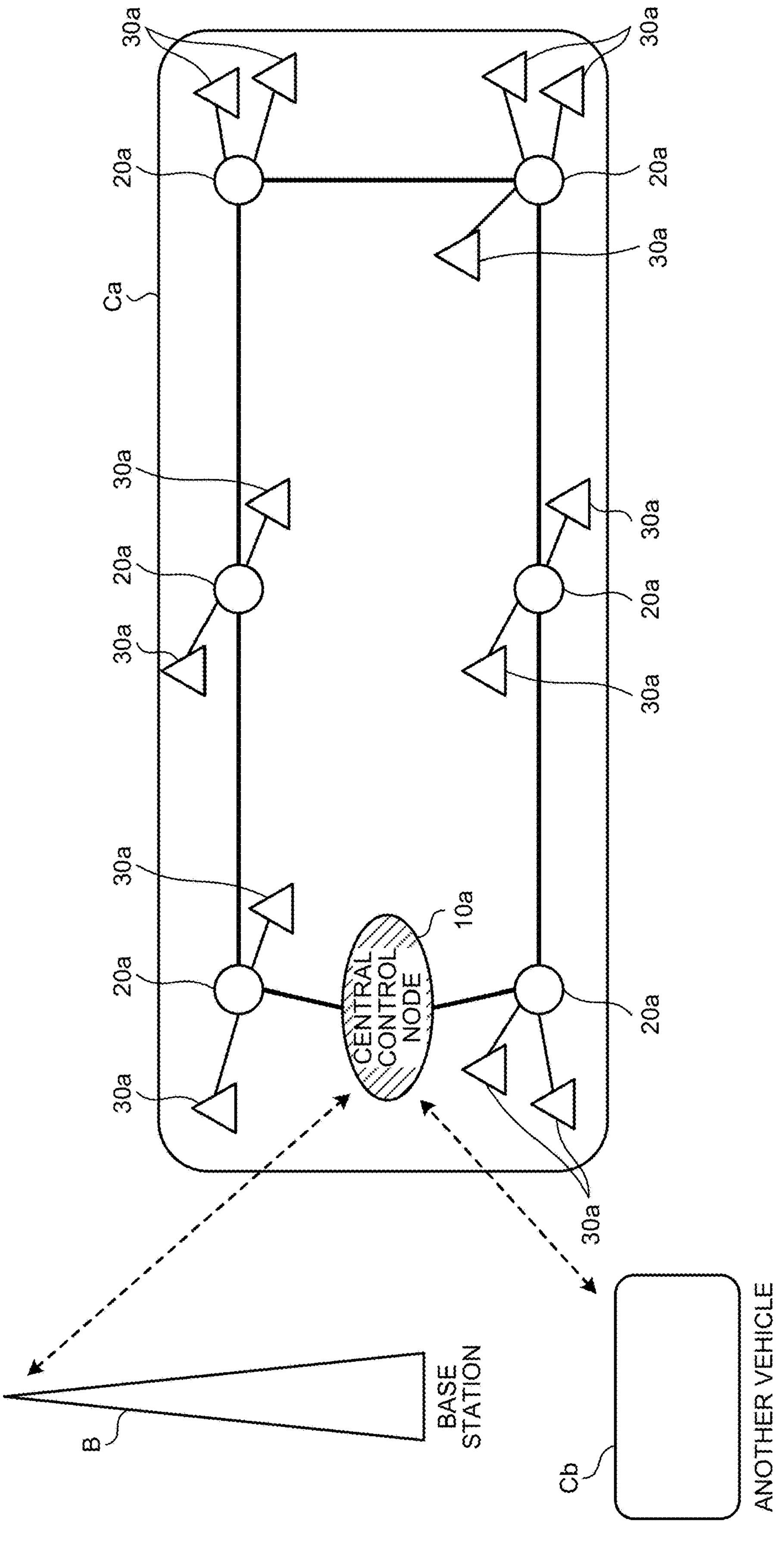
FIG. 1 is a view for describing an example of zone architecture.

In the following, embodiments of the present disclosure will be described in detail with reference to the accompanying drawings. Note that the same reference signs are assigned to components having substantially the same functional configuration, and overlapped description is omitted in the present specification and the drawings.

Furthermore, in the present specification and the drawings, similar components of embodiments may be distinguished by assignment of different alphabets or numbers after the same reference numerals. However, in a case where it is not specifically necessary to distinguish the similar components from each other, only the same reference sign is assigned.

Each of one or a plurality of embodiments (including examples and modification examples) described in the following can be performed independently. On the other hand, at least a part of the plurality of embodiments described in the following may be appropriately combined with at least a part of the other embodiments. The plurality of embodiments may include novel features different from each other. Thus, the plurality of embodiments can contribute to solving different objects or problems, and can exhibit different effects.

1. INTRODUCTION

<1.1. Zone Architecture>

In recent years, practical application of automatic driving, an electric vehicle (EV), and energy saving of a vehicle have been promoted. In addition, with these kinds of evolution of the vehicle, the vehicle itself is connected to a network (connected car), and many sensors are mounted on the vehicle.

As described above, when many sensors are mounted on the vehicle, a cable that connects the sensors is required and weight reduction of the vehicle is hindered.

Thus, in recent years, a technology called zone architecture has attracted attention in intra-vehicle communication.

Here, an example of the zone architecture will be described with reference to FIG. 1. FIG. 1 is a view for describing the example of the zone architecture.

In the zone architecture illustrated in FIG. 1, a vehicle Ca is divided into a plurality of regions (zones), and a control node 20*a* (hereinafter, also referred to as a zone control node 20*a*) is provided in each region. For example, the plurality of zone control nodes 20*a* is connected in a ring shape by a trunk cable, and performs wired communication with each other. As described above, in the vehicle Ca illustrated in FIG. 1, a ring-type wired communication network is constructed. As another example of the wired communication network, there is a configuration in which a plurality of zone control nodes 20*a* is connected to each other in a mesh shape by a trunk cable.

In addition, the zone control node 20*a* in each region is connected to one or more devices 30*a* by, for example, a cable and communicates with each of the devices 30*a*.

Each of the devices 30*a* includes, for example, a sensor such as a camera or a ranging device, a control device that controls an engine or the like, and a display device such as a car navigation system or a DVD. As described above, for example, each of the devices 30*a* is mounted on the vehicle Ca, and includes a device that is to acquire information for performing automatic driving and to perform control, and a device to present entertainment, a vehicle status, and the like to a user who is on the vehicle Ca.

Each of the devices 30*a* communicates with another device 30*a* mounted on the vehicle Ca via the zone control node 20*a*.

In such a manner, by realizing the intra-vehicle communication by using the zone architecture, it is possible to reduce the number of cables and a cable length for connecting the sensors, whereby it is possible to reduce a weight of the vehicle and to improve fuel efficiency.

Note that in the intra-vehicle communication, a time sensitive network (TSN) may be constructed. The TSN is a network based on the Ethernet, and is a network in which time synchronization is guaranteed and real-time property can be secured.

In addition, in use cases such as remote driving and platooning, it is necessary to access a control system of the vehicle Ca from the outside of the vehicle. In this case, a network in the vehicle Ca (hereinafter, it is also referred to as an in-vehicle local area network (LAN)) needs to be connected to an external network.

Thus, in FIG. 1, a central control node 10*a* is provided in the vehicle Ca. The central control node 10*a* is connected to the zone control nodes 20*a* via, for example, cables. As a result, the central control node 10*a* communicates with the zone control node 20*a* and the devices 30*a* via the in-vehicle LAN.

In addition, the central control node 10*a* performs wireless communication with another vehicle Cb and a base station B. Note that in the following drawings, wired communication is indicated by a straight line, and wireless communication is indicated by a dotted line.

In such a manner, by zoning the vehicle Ca and providing the zone control node 20*a* for each zone, it is possible to reduce the number of cables connecting the sensors and the cable length, and it is possible to reduce the weight of the vehicle and improve the fuel efficiency. In addition, since the central control node 10*a* is provided in the in-vehicle LAN and connection to a network outside the vehicle is performed via the central control node 10*a*, whereby safety with respect to security can be improved.

<1.2. Problem>

As described above, the vehicle Ca is divided into a plurality of zones on the basis of the zone architecture and the zones are conned by the trunk cable, whereby the in-vehicle LAN is constructed. In the trunk cable, communication is performed regardless of a kind of data (such as importance, a requirement to latency, and the like). Here, the kind of data includes, for example, data for controlling the vehicle Ca such as an accelerator or a brake, data related to entertainment such as TV or music, data detected by a sensor, data related to opening and closing of a door, and the like.

In addition, as described above, the number of cables of the vehicle Ca is reduced by the zone architecture. On the other hand, importance of the trunk cable connecting the zone control nodes 20*a* becomes very high. Thus, in a case where failure is generated in the trunk cable, various systems and functions in the vehicle Ca are affected.

In addition, in a case where connection from the external network to the inside of the in-vehicle LAN is performed, robustness to security is very important. Specifically, access to the control system of the vehicle Ca is required to have very high robustness also in terms of cyber security. In a case where a malicious person accesses the control system via the external network and controls the vehicle Ca, a serious accident may be caused.

As described above, in the in-vehicle LAN adopting the zone architecture, it is required to realize more robust intra-vehicle communication.

<1.3. Outline of a Proposed Technology>

Thus, in the proposed technology of the present disclosure, wireless communication is performed in the in-vehicle LAN constructed by a wired cable and communication is made redundant.

More specifically, in the technology of the present disclosure, both a wired communication network and a wireless communication network are constructed in the vehicle, and the in-vehicle communication device mounted in the vehicle performs communication via both the wired communication network and the wireless communication network.

The in-vehicle communication device transmits first data via the wired communication network and transmits second data via the wireless communication network. For example, the first data and the second data are different pieces of data.

Note that the in-vehicle communication device is any of the above-described central control node, zone control node, or device, or a wireless control node (described later).

As described above, since the in-vehicle communication device transmits the first data via the wired communication network and transmits the second data via the wireless communication network, communication can be made redundant, and more robust intra-vehicle communication can be realized.

2. CONFIGURATION OF A COMMUNICATION SYSTEM

As described above, in a system to which the proposed technology is applied, the wired communication network and the wireless communication network are constructed. Here, the wireless communication network may be constructed in a several kinds of topology such as a ring type, a star type, and a tree type. The proposed technology can be applied to a communication system including wireless communication networks having different kinds of topology. Thus, first, a configuration example of a communication system to which the proposed technology is applied will be described for each kind of topology of the wireless communication network.

<2.1. Wireless Communication Between Zone Control Nodes>

<2.1.1. Wireless Communication Via a Wireless Control Node>

(Star Type)

Figure 2:
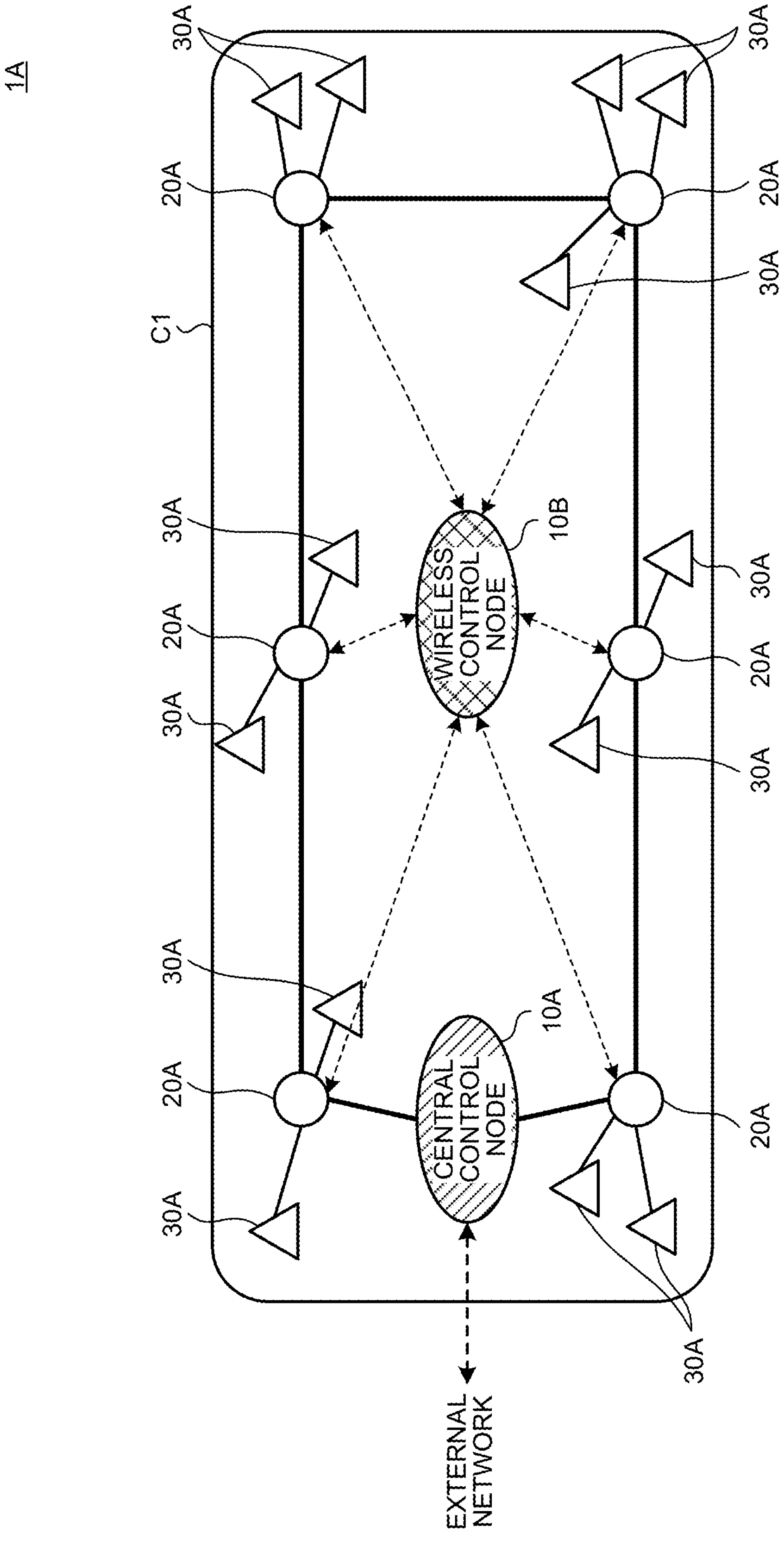
FIG. 2 is a view illustrating an example of a schematic configuration of a communication system according to an embodiment of the present disclosure.

First, an example of a schematic configuration of a communication system 1A to which the proposed technology is applied will be described with reference to FIG. 2. FIG. 2 is a view illustrating the example of the schematic configuration of the communication system 1A according to an embodiment of the present disclosure. As illustrated in FIG. 2, the communication system 1A according to the present embodiment is provided in a vehicle C1. The communication system 1A includes a central control node 10A, a wireless control node 10B, zone control nodes 20A, and devices 30A.

The central control node 10A is an in-vehicle communication device that controls communication in the wired communication network. The central control node 10A is connected to the zone control nodes 20A in a ring shape via a trunk cable, and performs wired communication with the zone control nodes 20A. In addition, the central control node 10A communicates with the devices 30A and the wireless control node 10B via the zone control nodes 20A.

In addition, the central control node 10A is connected to the external network via wireless communication. The central control node 10A communicates with a base station (not illustrated) through Uu link communication in the 3GPP, or communicates with another vehicle (not illustrated) through sidelink communication, for example.

The wireless control node 10B is an in-vehicle communication device that controls communication in the wireless communication network. The wireless control node 10B performs wireless communication with each of the plurality of zone control nodes 20A.

The zone control node 20A is provided in each region (zone) of the vehicle C1 divided into a plurality of regions. The zone control nodes 20A are connected in a ring shape via the trunk cable, and perform the wired communication with another zone control node 20A and the central control node 10A.

In addition, the zone control nodes 20A perform wireless communication with the wireless control node 10B. Note that the zone control nodes 20A perform the wireless communication with each other via the wireless control node 10B instead of performing direct wireless communication. As described above, the topology of the wireless communication network constructed in the communication system 1A is a star type.

The device 30A is an in-vehicle communication device that acquires and notifies of various kinds of information and the like. The device 30A includes, for example, a sensor such as a camera or a ranging device, a control device that controls an engine or the like, and a display device such as a car navigation system or a DVD. For example, the device 30*a* is mounted on the vehicle C1, and includes a device that is to acquire information for performing automatic driving and to perform control, and a device to present entertainment, a vehicle status, and the like to a user who is on the vehicle C1.

The device 30A is provided in each region (zone) of the vehicle C1 divided into a plurality of regions. A plurality of the devices 30A may be provided in one zone. Each of the devices 30A is connected via a cable to the zone control node 20A corresponding to each region, and performs the wired communication with the zone control node 20A.

Each of the devices 30A communicates with another device (such as another device 30A, another zone control node 20A, the central control node 10A, and the wireless control node 10B) via the zone control node 20A.

As illustrated in FIG. 2, the zone control nodes 20A perform both the wired communication and the wireless communication, whereby redundancy of communication in the communication system 1A can be secured.

(Tree Type)

Although the topology of the wireless communication network is the star type in FIG. 2, this is not a limitation. For example, the topology of the wireless communication network may be a tree type. This case will be described with reference to FIG. 3.

Figure 3:
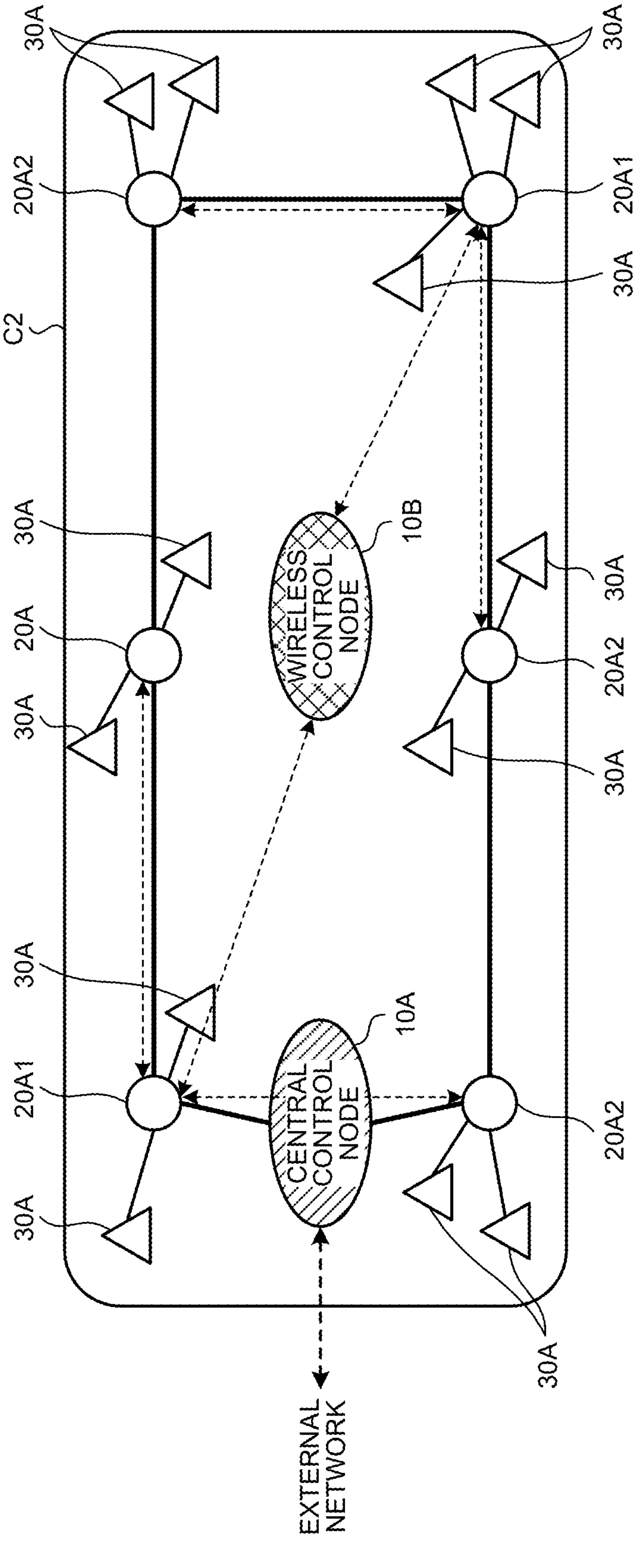
FIG. 3 is a view illustrating an example of a schematic configuration of a communication system according to an embodiment of the present disclosure.

FIG. 3 is a view illustrating an example of a schematic configuration of a communication system 1B according to an embodiment of the present disclosure. As illustrated in FIG. 3, the communication system 1B according to the present embodiment is provided in a vehicle C2.

A wireless control node 10B illustrated in FIG. 3 is different from that of the communication system 1A in FIG. 2 in a point that direct wireless communication with a zone control node 20A2 is not performed although direct wireless communication with a zone control node 20A1 is performed.

The zone control node 20A1 performs the direct wireless communication with the wireless control node 10B and the zone control node 20A2.

The zone control node 20A2 performs the direct wireless communication with the zone control node 20A1. The zone control node 20A2 performs wireless communication with the wireless control node 10B via the zone control node 20A1 although not performing the direct wireless communication with the wireless control node 10B.

As described above, the communication system 1B according to the embodiment of the present disclosure may perform the wireless communication via the tree-type wireless communication network.

<2.1.2. Direct Wireless Communication Between Zone Control Nodes>

Although the zone control nodes 20A perform the wireless communication via the wireless control node 10B in each of the communication systems 1A and 1B, this is not a limitation. For example, the zone control nodes 20A may directly perform the wireless communication with each other.

(Mesh Type and Full Connection Type)

Figure 4:
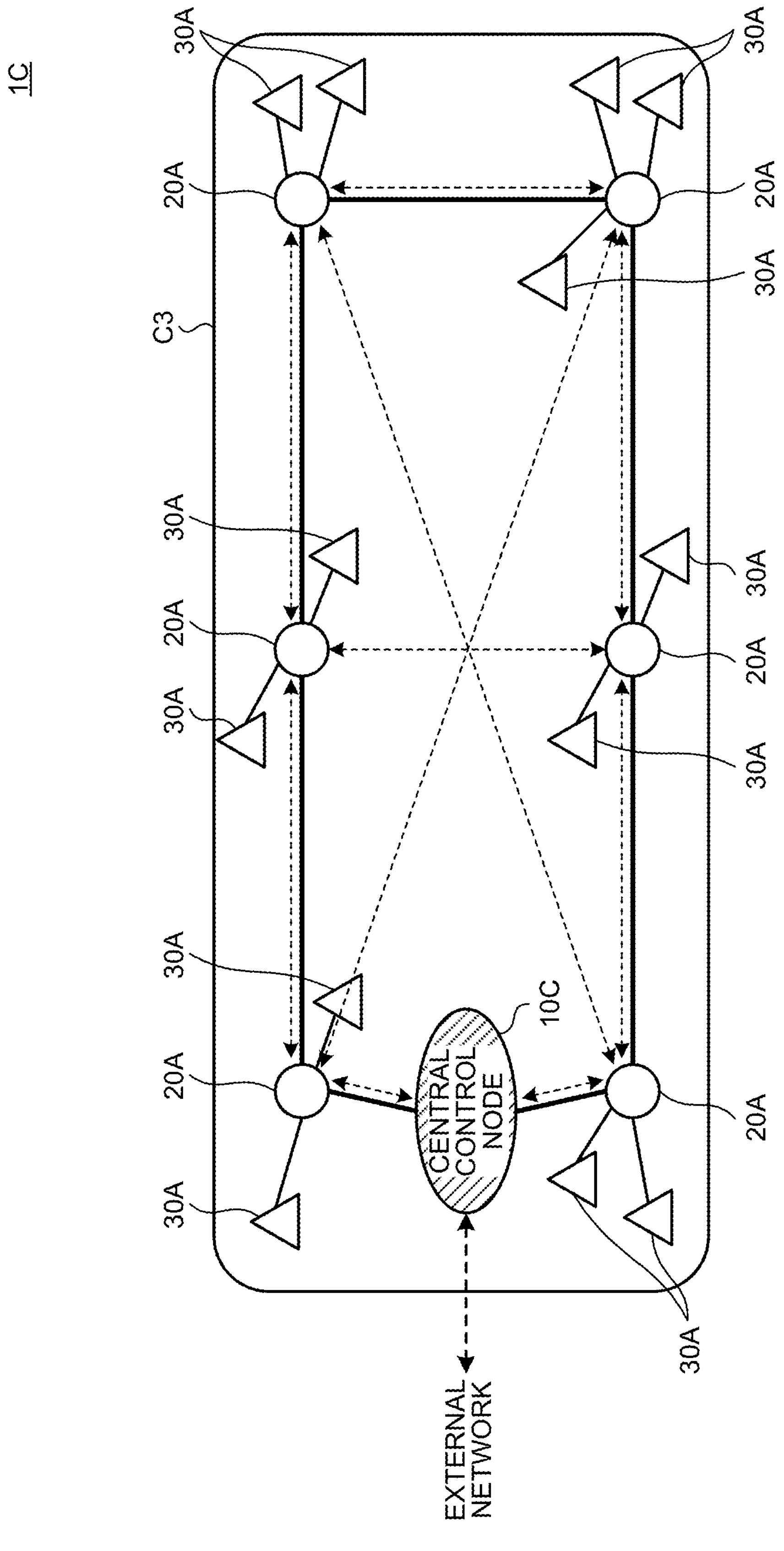
FIG. 4 is a view illustrating an example of a schematic configuration of a communication system according to an embodiment of the present disclosure.

FIG. 4 is a view illustrating an example of a schematic configuration of a communication system 1C according to an embodiment of the present disclosure. As illustrated in FIG. 4, the communication system 1C according to the present embodiment is provided in a vehicle C3.

A communication system 1C illustrated in FIG. 4 is different from the communication systems 1A and 1B illustrated in FIGS. 2 and 3 in a point that a wireless control node 10B is not included. Furthermore, the communication system 1C includes a central control node 10C instead of the central control node 10A illustrated in each of FIGS. 2 and 3.

Each of zone control nodes 20A illustrated in FIG. 4 performs wireless communication with another zone control node 20A. In addition, the zone control nodes 20A perform the wireless communication with the central control node 10C. In the example of FIG. 4, the communication system 1C performs the wireless communication via a mesh-type wireless communication network.

Here, although a case where each of the zone control nodes 20A performs the wireless communication with three nodes is illustrated, the zone control node 20A may perform the wireless communication with a plurality of nodes. For example, each of the zone control nodes 20A may perform the wireless communication with all the zone control nodes 20A. In such a manner, the communication system 1C may perform the wireless communication via a full connection-type wireless communication network.

(Ring Type)

Although the topology of the wireless communication network is the mesh type or the full connection type in FIG. 4, this is not a limitation. For example, the topology of the wireless communication network may be the same ring type as the wired network. Such a case will be described with reference to FIG. 5.

Figure 5:
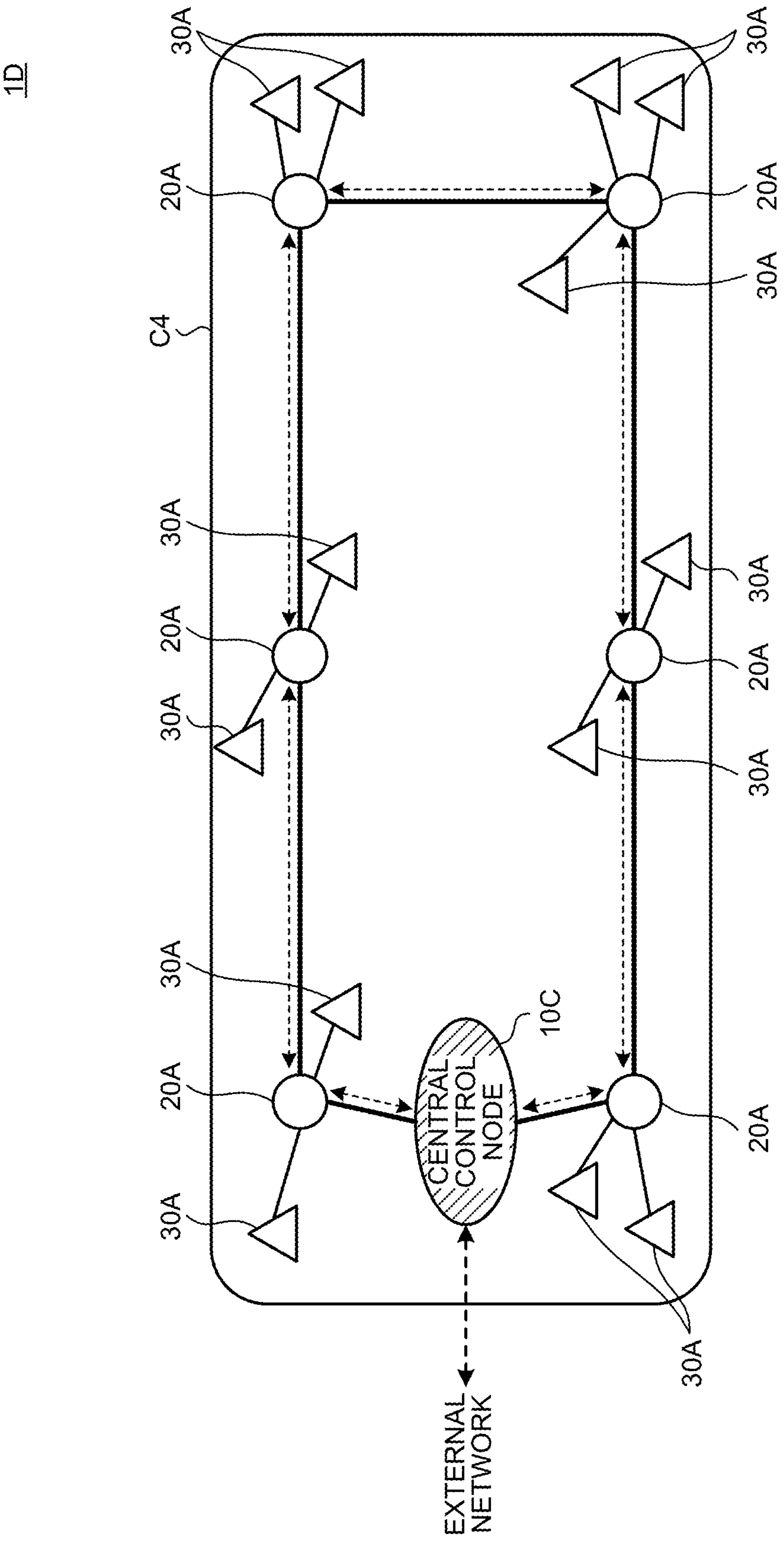
FIG. 5 is a view illustrating an example of a schematic configuration of a communication system according to an embodiment of the present disclosure.

FIG. 5 is a view illustrating an example of a schematic configuration of a communication system 1D according to an embodiment of the present disclosure. As illustrated in FIG. 5, the communication system 1D according to the present embodiment is provided in a vehicle C4.

Zone control nodes 20A illustrated in FIG. 5 perform wireless communication with the zone control nodes 20A connected by a trunk cable, for example. That is, each of the zone control nodes 20A also performs direct wireless communication with another zone control node 20A that performs the direct wired communication.

As described above, as in the communication system 1D, topology of a wireless communication network and topology of a wired communication network may be the same.

<2.2. Wireless Communication Between Devices>

Although the zone control nodes 20A perform the wireless communication in each of the communication systems 1A to 1D described above, this is not a limitation. For example, a device 30B may perform wireless communication. This case will be described with reference to FIG. 6 to FIG. 8.

<2.2.1. Wireless Communication Via a Wireless Control Node>

(Star Type)

Figure 6:
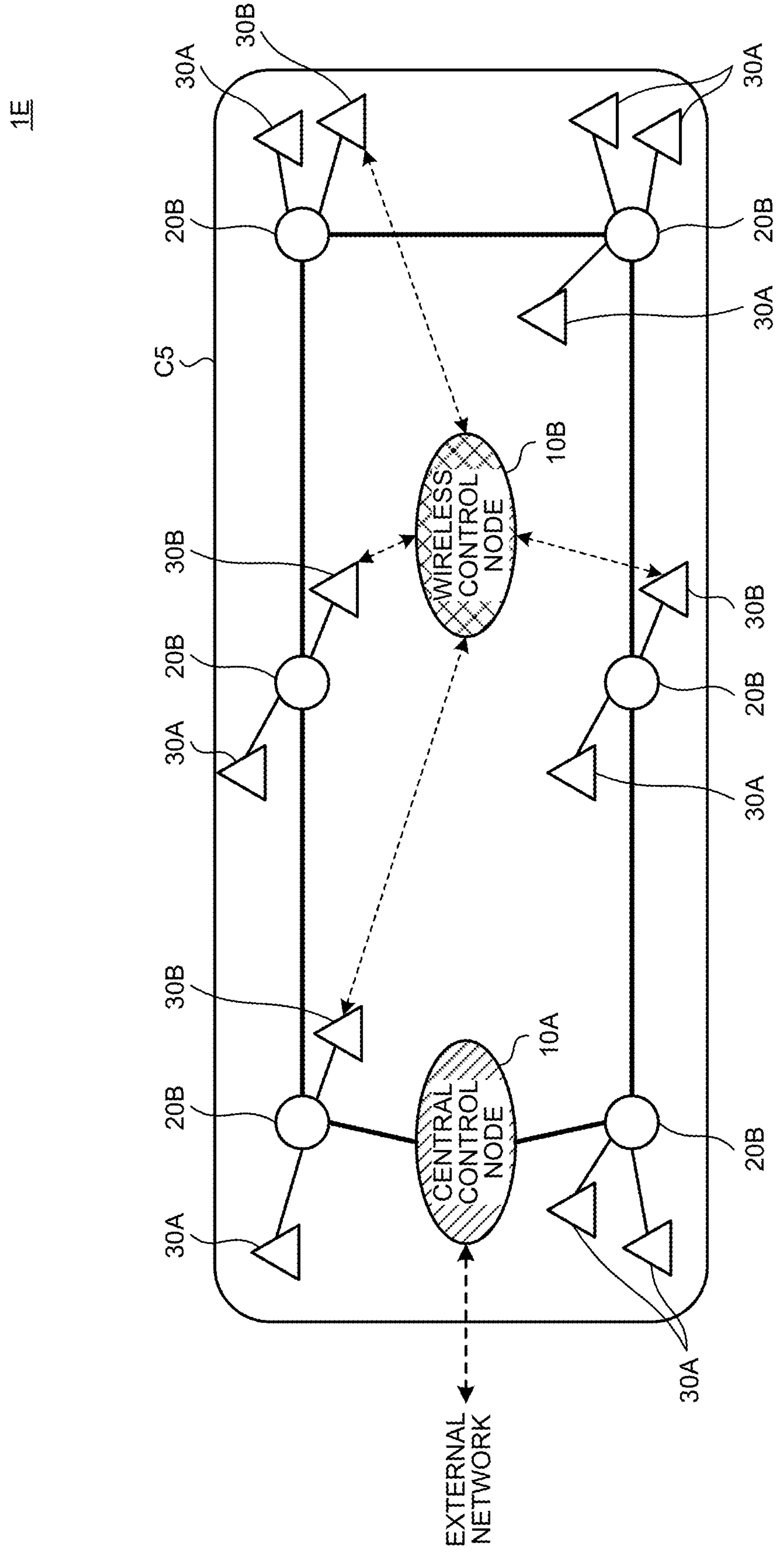
FIG. 6 is a view illustrating an example of a schematic configuration of a communication system according to an embodiment of the present disclosure.

First, an example of a schematic configuration of a communication system 1E to which the proposed technology is applied will be described with reference to FIG. 6. FIG. 6 is a view illustrating an example of a schematic configuration of the communication system 1E according to an embodiment of the present disclosure. As illustrated in FIG. 6, the communication system 1E according to the present embodiment is provided in a vehicle C5.

The communication system 1E according to the present embodiment includes zone control nodes 20B instead of the zone control nodes 20A. Furthermore, the communication system 1E further includes devices 30B in addition to the devices 30A.

The zone control nodes 20B are different from the zone control nodes 20A in each of FIGS. 2 to 5 in a point of performing wired communication and not performing wireless communication. In addition, the devices 30B perform the wireless communication with a wireless control node 10B. In the example of FIG. 6, the devices 30B perform the wireless communication with each other via the wireless control node 10B instead of performing direct wireless communication. As described above, topology of a wireless communication network constructed in the communication system 1E is a star type.

(Tree Type)

Although the topology of the wireless communication network is the star type in FIG. 6, this is not a limitation. For example, the topology of the wireless communication network may be a tree type. This point will be described with reference to FIG. 7.

Figure 7:
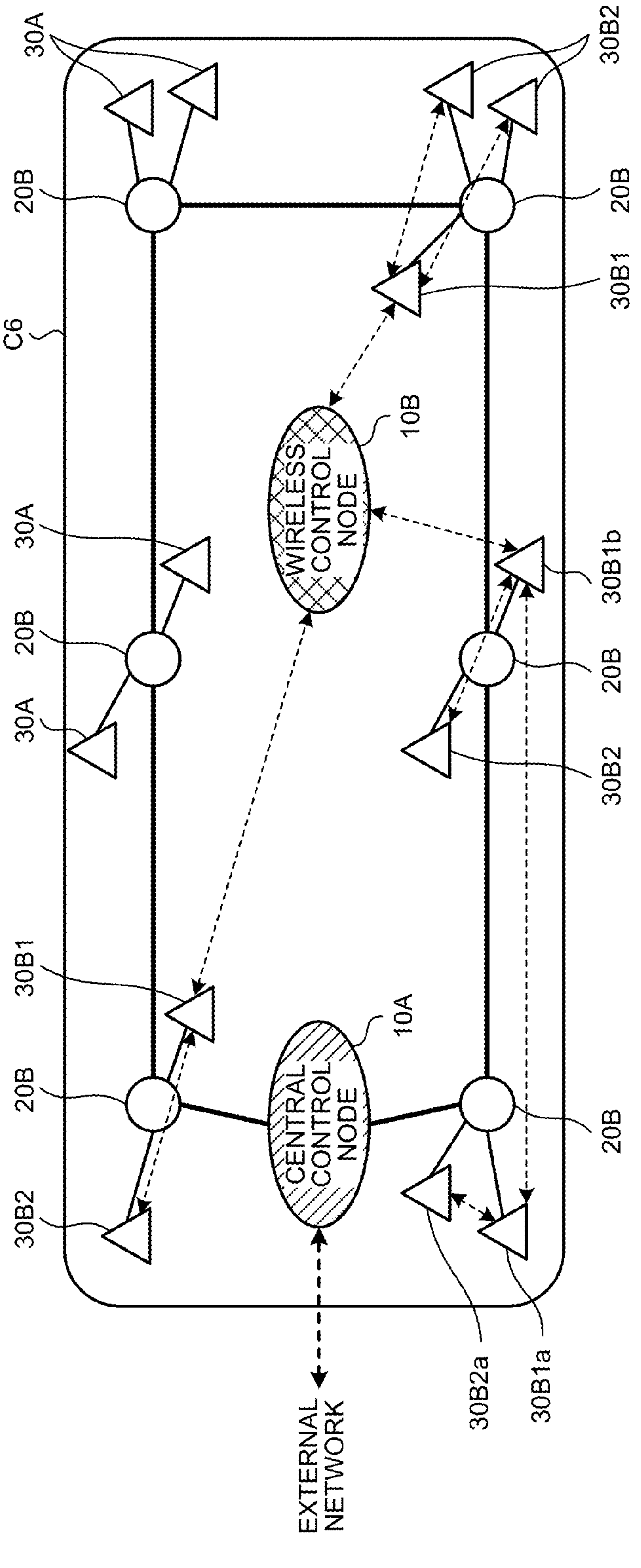
FIG. 7 is a view illustrating an example of a schematic configuration of a communication system according to an embodiment of the present disclosure.

FIG. 7 is a view illustrating an example of a schematic configuration of a communication system 1F according to an embodiment of the present disclosure. As illustrated in FIG. 7, the communication system 1F according to the present embodiment is provided in a vehicle C6.

A wireless control node 10B illustrated in FIG. 7 is different from that of the communication system 1E in FIG. 6 in a point that direct wireless communication with a device B2 is not performed although direct wireless communication with a device B1 is performed.

The device B1 performs the direct wireless communication with the wireless control node 10B and the device B2. The device B2 performs the direct wireless communication with the device B1. The device B2 performs wireless communication with the wireless control node 10B via the device B1 although not performing the direct wireless communication with the wireless control node 10B.

Note that the device B2 may perform the wireless communication with the wireless control node 10B via one or more devices B1. In the example of FIG. 7, a case where a device B2*a* is connected to the wireless control node 10B via two devices 30B1*a* and 30B1*b* is illustrated.

As described above, the communication system 1F according to the embodiment of the present disclosure may perform the wireless communication via the tree-type wireless communication network.

<2.2.2. Direct Wireless Communication Between Devices>

Although the devices 30B perform the wireless communication via the wireless control node 10B in each of the communication systems 1E and 1F, this is not a limitation.

For example, devices 30B may perform direct wireless communication with each other.

(Mesh Type and Full Connection Type)

Figure 8:
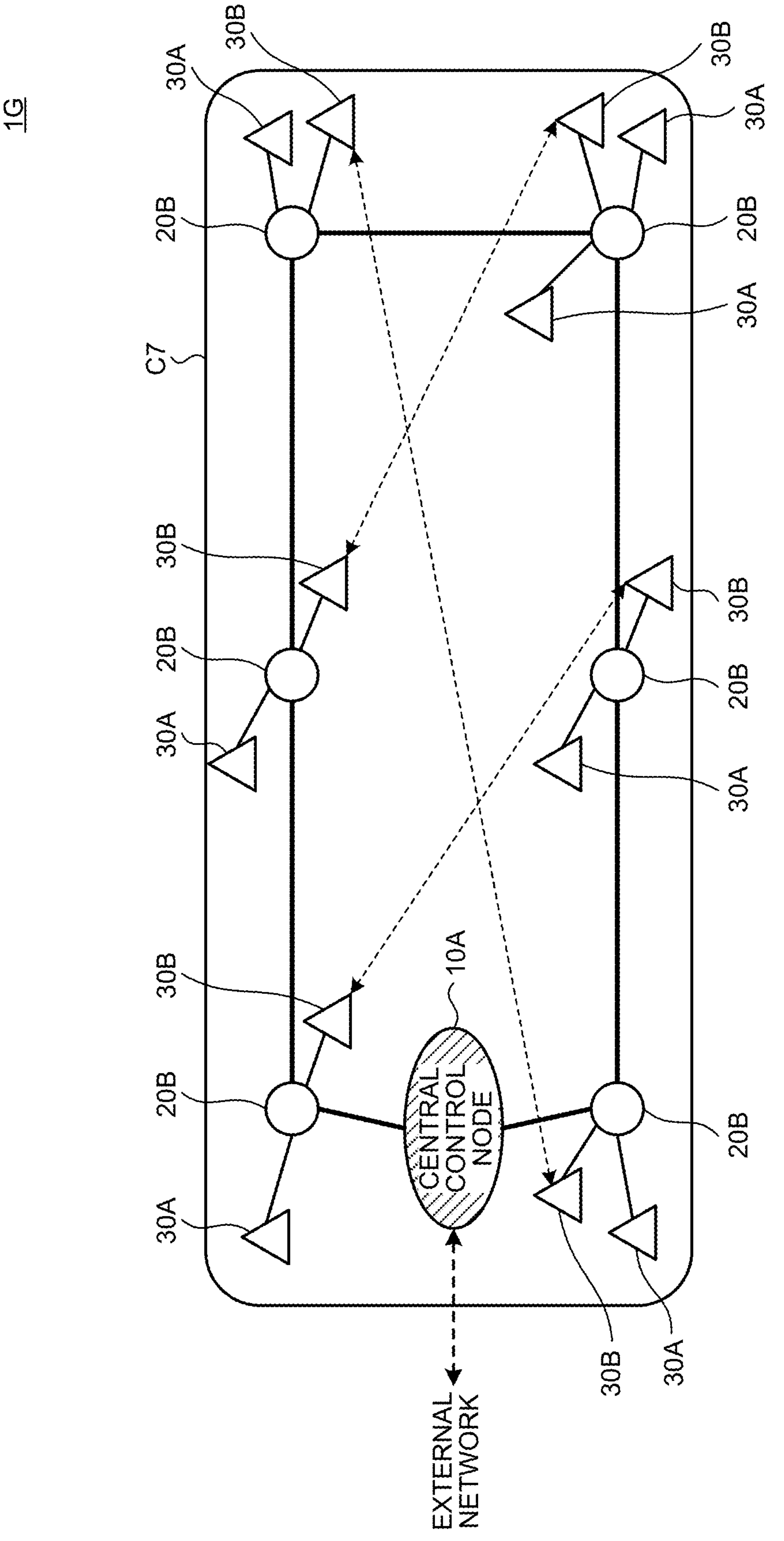
FIG. 8 is a view illustrating an example of a schematic configuration of a communication system according to an embodiment of the present disclosure.

FIG. 8 is a view illustrating an example of a schematic configuration of a communication system 1G according to an embodiment of the present disclosure. As illustrated in FIG. 8, the communication system 1G according to the present embodiment is provided in a vehicle C7. The communication system 1G illustrated in FIG. 8 is different from the communication systems 1E and 1F respectively illustrated in FIGS. 6 and 7 in a point that a wireless control node 10B is not included.

The device 30B illustrated in FIG. 8 performs wireless communication with another device 30B. The communication system 1C performs wireless communication via a mesh-type wireless communication network.

Note that although a case where each of the devices 30B performs the wireless communication with one node is illustrated herein, the device 30B may perform the wireless communication with a plurality of nodes. For example, each of the devices 30B may perform the wireless communication with all the devices 30B. In such a manner, the communication system 1G may perform the wireless communication via a full connection-type wireless communication network.

3. CONFIGURATION EXAMPLE OF AN IN-VEHICLE COMMUNICATION DEVICE

Figure 9:
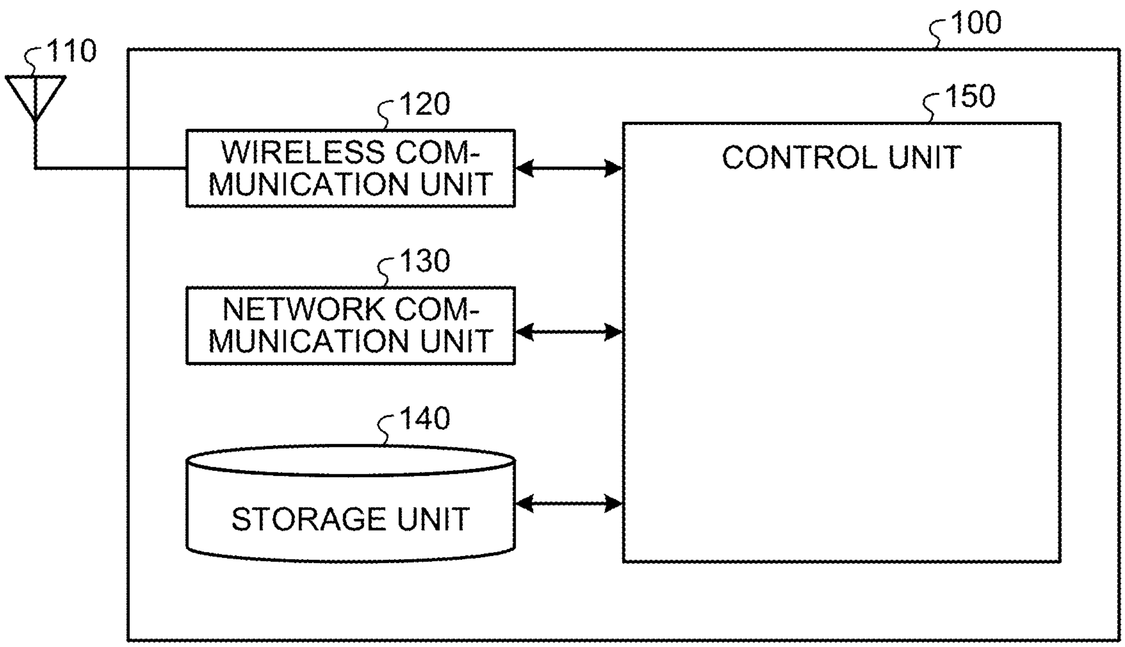
FIG. 9 is a block diagram illustrating an example of a configuration of an in-vehicle communication device according to an embodiment of the present disclosure.

FIG. 9 is a block diagram illustrating an example of a configuration of an in-vehicle communication device 100 according to an embodiment of the present disclosure. The in-vehicle communication device 100 functions as each node or a device 30 of a communication system 1. With reference to FIG. 9, the in-vehicle communication device 100 includes an antenna unit 110, a wireless communication unit 120, a network communication unit 130, a storage unit 140, and a control unit 150.

(1) Antenna Unit 110

The antenna unit 110 radiates a signal, which is output from the wireless communication unit 120, into space as a radio wave. Furthermore, the antenna unit 110 converts a radio wave in the space into a signal and outputs the signal to the wireless communication unit 120. Note that the antenna unit 110 of the present embodiment includes a plurality of antenna elements and can form a beam.

(2) Wireless Communication Unit 120

The wireless communication unit 120 transmits and receives signals. For example, the wireless communication unit 120 transmits a signal to another device and receives a signal from another device.

For example, in a case where the in-vehicle communication device 100 functions as the central control node 10A or 10C, the wireless communication unit 120 communicates with a base station and another vehicle via an external network. In addition, in a case where the in-vehicle communication device 100 functions as the wireless control node 10B, the wireless communication unit 120 communicates with the zone control node 20A. In a case where the in-vehicle communication device 100 functions as the zone control node 20A, the wireless communication unit 120 communicates with the wireless control node 10B and another zone control node 20A. In a case where the in-vehicle communication device 100 functions as the device 30B, the wireless communication unit 120 communicates with the wireless control node 10B and another device 30B.

The wireless communication unit 120 can form a plurality of beams by the antenna unit 110 and perform external network communication.

(3) Network Communication Unit 130

The network communication unit 130 transmits and receives information. For example, the network communication unit 130 transmits information to another in-vehicle communication device 100 and receives information from another in-vehicle communication device. For example, in a case where the in-vehicle communication device 100 functions as the central control node 10A or 10C, the network communication unit 130 communicates with a zone control node 20 via a trunk cable. In a case where the in-vehicle communication device 100 functions as the zone control node 20, the network communication unit 130 communicates with the central control node 10A or 10C, another zone control node 20, and the device 30. In a case where the in-vehicle communication device 100 functions as the device 30, the network communication unit 130 communicates with the zone control node 20.

(4) Storage Unit 140

The storage unit 140 temporarily or permanently stores programs for the operation of the in-vehicle communication device 100, and various kinds of data.

(5) Control Unit 150

The control unit 150 is a controller that controls each unit of the in-vehicle communication device 100. The control unit 150 is realized by, for example, a processor such as a CPU or an MPU. For example, the control unit 150 is realized by the processor executing various programs stored in a storage device inside the in-vehicle communication device 100 by using a RAM or the like as a work area. Note that the control unit 150 may be realized by an integrated circuit such as an ASIC or FPGA. Each of the CPU, MPU, ASIC, and FPGA can be regarded as a controller.

Note that in a case where the in-vehicle communication device 100 functions as a node that performs wireless communication and that does not perform wired communication, such as the wireless control node 10B, the network communication unit 130 described above may be omitted. Furthermore, in a case where the in-vehicle communication device 100 functions as a node that does not perform wireless communication and that performs wired communication, such as the zone control node 20B or the device 30A, the antenna unit 110 and the wireless communication unit 120 described above may be omitted.

Furthermore, in a case where the in-vehicle communication device 100 functions as the device 30 that is, for example, a sensor that acquires information inside and outside the vehicle, the in-vehicle communication device 100 may include a sensor unit (not illustrated) that acquires the information. Furthermore, in a case where the in-vehicle communication device 100 is the device 30 that presents information to the user, such as a car navigation system, an input/output unit (not illustrated) may be included. As described above, the in-vehicle communication device 100 can have a configuration corresponding to a function to be realized.

4. DETAILS OF WIRELESS COMMUNICATION

Next, details of wireless communication by the communication system 1 according to the embodiment of the present disclosure will be described.

<4.1. Wireless Communication Via a Wireless Control Node>

As described above, in each of the communication systems 1A, 1B, 1E, and 1F, wireless communication via the wireless control node 10B is performed. In this case, the wireless control node 10B controls the wireless communication in the communication system 1. For example, the wireless control node 10B performs control such as resource allocation of the wireless communication in the communication system 1.

(Uu Link Communication)

The control of the wireless communication by the wireless control node 10B may be the same as control in an existing wireless communication system. For example, the wireless control node 10B performs Uu link communication in the 3GPP. The Uu link communication is communication between a base station and UE. In the present embodiment, the wireless control node 10B operates as the base station, and a communication partner of the wireless control node 10B (such as the zone control node 20A or the device 30B) functions as the UE. Note that details of the Uu link communication in the 3GPP are described in 3GPP TS 38.300 and the like.

(Sidelink Communication)

In addition, the wireless control node 10B may perform sidelink communication (PC5 communication) in the 3GPP. In this case, the wireless control node 10B performs the sidelink communication with a node that is a communication partner (hereinafter, also referred to as a communication node). The wireless control node 10B controls the sidelink communication. Note that details of the sidelink communication in the 3GPP are described in 3GPP TS 38.300 and the like.

(Integrated Access and Backhaul (IAB))

For example, in a case where the wireless communication network is a tree type as in each of the communication systems 1B and 1F, an intermediate node may operate as an IAB node. In this case, the intermediate node (such as the zone control node 20A1 or the device 30B1) operates as UE with respect to an upper node (such as the wireless control node 10B). In addition, the intermediate node operates as a base station with respect to a lower node (such as the zone control node 20A2 or the device 30B2). Note that details of IAB are described in 3GPP TS38.300 and the like.

<4.2. Direct Wireless Communication Between Nodes>

As described above, in the communication systems 1C, 1D, and 1G, each of the communication nodes (such as the zone control node 20A and the device 30B) performs direct wireless communication without the wireless control node 10B. In this case, the communication node performs direct communication by using a predetermined radio resource (time/frequency resource).

Here, the predetermined radio resource is, for example, a preconfigured resource. Such configuration is performed, for example, when a wireless communication network is installed in the in-vehicle LAN.

Alternatively, the predetermined radio resource may be managed by the central control node 10A or 10C. In this case, the central control node 10A or 10C dynamically or semi-statically configure the predetermined radio resource for each of the communication nodes (such as the zone control node 20A and the device 30B). Note that the wireless control node 10B that manages the radio resource may be provided instead of the central control node 10A or 10C.

Furthermore, the communication node may perform sensing, listen before talk (LBT), or the like before transmission, and select an empty resource and perform transmission after measuring a resource usage status.

Here, an existing wireless communication system may be used for direct wireless communication between communication nodes. For example, the communication node performs the sidelink communication in the 3GPP. In this case, the communication node on a transmission side performs sensing before transmission, and selects an empty resource and performs transmission after measuring a resource usage status.

Note that a radio resource on which the communication node performs the sensing and a radio resource available for the transmission may be preconfigured, or may be dynamically or semi-statically configured by the central control node 10A or 10C, or the like.

Note that the wireless communication method described above is an example. The communication system 1 can use various wireless communication methods such as WiFi (registered trademark), dedicated short range communication (DSRC), and IEEE 802.11p.

In addition, the communication system 1 may use wireless communication, which uses a licensed band and an unlicensed band, together. Generally, communication in the licensed band can acquire higher communication quality than communication in the unlicensed band. Utilizing this feature, the communication system 1 may perform the wireless communication by switching the licensed band and the unlicensed band or by using the both in combination. In a case of the 3GPP, the communication system 1 can use, for example, NR-U or the like.

5. REDUNDANCY BY WIRELESS COMMUNICATION AND WIRED COMMUNICATION

As described above, the communication system 1 according to the embodiment of the present disclosure makes communication redundant by performing wireless communication and wired communication. Hereinafter, a method of controlling the wireless communication and the wired communication for redundancy of the communication will be described.

Note that in the wireless communication and the wired communication, a case where the communication system 1 performs the wireless communication and the wired communication while sharing information related to control, and a case where the communication system 1 performs the wireless communication and the wired communication without sharing the information related to the control are considered, for example. Hereinafter, a case where the information related to the control is shared will be described as a case where the wired communication and the wireless communication are in cooperation with each other, and a case where the information related to the control is not shared will be described as a case where the wired communication and the wireless communication are independent from each other. Hereinafter, "independent" does not include a case where the wired communication network and the wireless communication network are completely independent from each other and do not affect each other at all.

<5.1. Cooperation Between Wireless Communication and Wired Communication>

For example, when the central control node 10A or 10C and the wireless control node 10B are connected in a wired or wireless manner, the wireless communication network and the wired communication network can perform communication in cooperation with each other. In this case, the central control node 10A or 10C or the wireless control node 10B controls communication in the wireless communication network and the wired communication network.

As described above, the method of performing cooperation between the wireless communication and the wired communication is suitable for a system that performs the wireless communication via the wireless control node 10B, such as the communication system 1A, 1B, 1E, or 1F described above.

Figure 10:
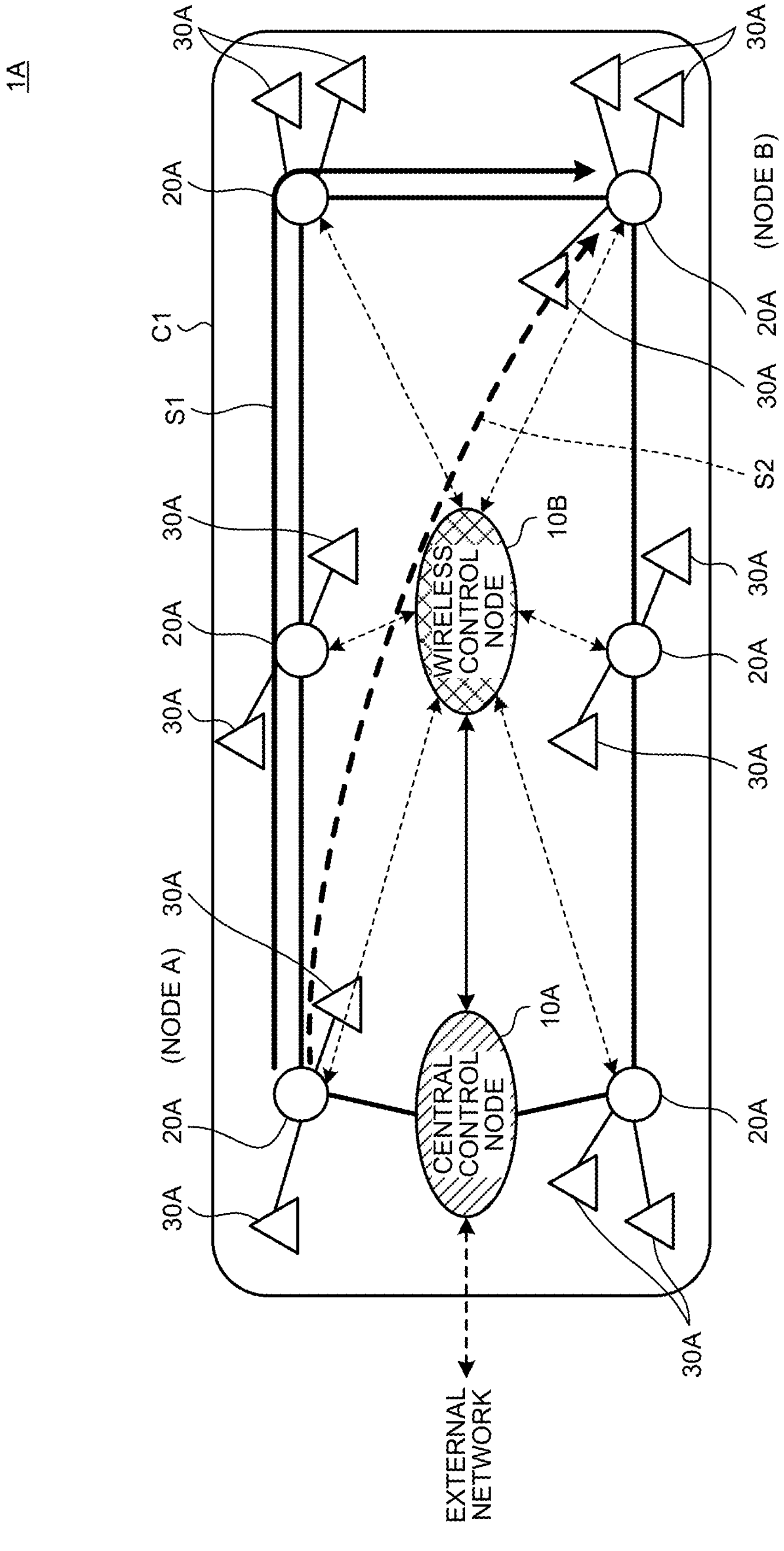
FIG. 10 is a view for describing an example of communication according to an embodiment of the present disclosure.

FIG. 10 is a view for describing an example of communication according to an embodiment of the present disclosure. Note that although the communication system 1A will be described as an example in FIG. 10, the other communication systems 1B, 1E, and 1F are in a similar manner.

As illustrated in FIG. 10, the central control node 10A and the wireless control node 10B are connected by wire, and cooperate with each other with respect to control of communication in each network. For example, the central control node 10A and the wireless control node 10B use information shared with each other and configure control information to control each network.

Here, it is assumed that a zone control node 20A arranged at a corner portion (upper left in FIG. 10) of the vehicle C1 among a plurality of zones illustrated in FIG. 10 is a node A. Furthermore, it is assumed that a zone control node 20A arranged in a zone diagonal to the node A (lower right in FIG. 10) among the plurality of zones is a node B. Hereinafter, a case where the node A transmits data to the node B will be described.

In this case, the node A may transmit data by using both the wired communication network and the wireless communication network (see S1 and S2 in FIG. 10). Data transmitted in each network is controlled by the central control node 10A. Note that such control may be performed by the wireless control node 10B, or both the central control node 10A and the wireless control node 10B.

[Switching of Used Networks]

The central control node 10A controls the nodes A and B or the entire network to use at least one of the wired communication or the wireless communication according to a predetermined state such as a communication environment.

Predetermined State Example (Failure/Unauthorized Intrusion)

Examples of the predetermined state include a case where a failure is generated in the wired communication network or the wireless communication network (hereinafter, also simply referred to as the network), and a case where intrusion from the outside is detected.

For example, the central control node 10A monitors the network and determines whether to detect a detected event as failure generation or unauthorized intrusion in consideration of a degree of influence in a case of the generation, a probability of the generation, and the like.

Alternatively, the central control node 10A may detect a failure or unauthorized intrusion (unauthorized access) by using a big data analysis. The central control node 10A acquires various kinds of data related to the failure generation or the unauthorized intrusion in the network. The central control node 10A performs analysis by AI by using the acquired data. By using a result of the analysis, the central control node 10A determines whether an event detected on the network in the vehicle C1 is to be detected as the failure generation or the unauthorized intrusion.

Note that the failure herein includes a threat related to a human operation. This threat includes an unapproved or inadvertent software update, a configuration error, a program error, data damage by an operator or a user, and the like.

(Dangerous Situation)

Examples of the predetermined state include a state that may cause danger to the vehicle C1. Examples of the state that may cause the danger include a case where a traffic accident is generated in front of the vehicle C1 and a case where an earthquake early warning is received. For example, in a case where a traffic accident is detected by a camera or the like, or in a case where information related to a traffic accident or an earthquake early warning is received, the central control node 10A determines that there is a possibility of endangering the vehicle C1.

(Communication Data Amount)

Examples of the predetermined state include a state of an amount of data (traffic amount) exchanged on the network. The central control node 10A determines that a state is the predetermined state, for example, in a case where the amount of data communicated on the network is increased to a threshold or more (or a case of being decreased to less than the threshold).

Communication Switching Example (Use One Network)

For example, in a case of determining that the state of the network is the predetermined state, the central control node 10A performs switching to communication in one of the wired communication network or the wireless communication network. For example, the central control node 10A stops using the network determined to be in the predetermined state.

Specifically, for example, in a case of detecting a failure or intrusion from the outside in the wired communication network, the central control node 10A stops using the wired communication network and performs switching to communication in the wireless communication network. In addition, in a case of detecting a failure or intrusion from the outside in the wireless communication network, the central control node 10A (or wireless control node 10B) stops using the wireless communication network and performs switching to communication in the wired communication network.

(Use the Both Networks)

For example, in a case of determining that the state of the network is the predetermined state, the central control node 10A transmits important information related to the predetermined state by using both the wired communication network and the wireless communication network. Examples of the important information related to the predetermined state include information for notifying of the state (such as a dangerous state), information related to processing for starting or reducing the state, and the like.

As described above, since the central control node 10A transmits the information related to the predetermined state by using both of the networks, it is possible to improve reliability of the transmitted information.

(Switching According to a Kind of Data)

The central control node 10A switches the network to be used for each kind of data to be transmitted according to a predetermined state. For example, in a case where the amount of data in the in-vehicle LAN increases beyond the threshold, the central control node 10A performs control in such a manner that data with low importance is communicated by the wireless communication and data with high importance is communicated by the wired communication. Examples of the data with low importance include data related to entertainment, such as video data of television.

Furthermore, examples of the data with high importance include data related to a vehicle control system.

As described above, the central control node 10A switches the used networks according to the importance of the transmission data, whereby congestion of the wired communication network can be reduced. As a result, the communication system 1A can further reduce a delay and increase reliability of the transmission of the data with high importance.

[Determination of a Transmission Parameter and a Transmission Method]

The central control node 10A determines a transmission parameter and a transmission method related to data transmitted in at least one of the wired communication or the wireless communication.

Examples of the transmission parameter determined by the central control node 10A include a modulation system such as QPSK or 16QAM, a coding rate of an error correction code, a time/frequency resource for transmission, transmission power, transmission timing, and the like.

[Combination/Switching of the Wireless Communication]

In addition, in a case where communication is performed by utilization of the wired communication network, the central control node 10A executes combination or switching with the wireless communication network according to a condition. Such combination or switching with the wireless communication network may be executed for each zone, or may be executed as communication in the entire vehicle C1.

(Configuration)

For example, the central control node 10A uses the wireless communication in combination with the wired communication on the condition that combination between the wireless communication and the wired communication is configured. The combination with the wireless communication may be preconfigured, or may be configured by a software update or the like, for example.

(Geographic Information)

In addition, the central control node 10A may determine whether to execute the wireless communication by using geographic information or position information of the vehicle C1. For example, in a case where the vehicle C1 is traveling in an area with many other vehicles and people, such as an urban area, it may be considered that the amount of data exchanged in the in-vehicle LAN is increased and the central control node 10A may use the wireless communication together.

Furthermore, the central control node 10A may change a kind of the wireless communication to be used and configuration of a communication parameter including the above-described transmission parameter according to the geographic information and the position information of the vehicle C1.

(Traffic)

The central control node 10A may execute combination or switching of the wireless communication on the condition that traffic of the wired communication is equal to or larger than a preconfigured threshold. For example, in a case of determining that the traffic of the wired communication is equal to or larger than the threshold and QoS of a specific packet cannot be satisfied, the central control node 10A uses the wireless communication together or performs switching to the wireless communication.

The traffic of the wired communication may be measured over the entire wired communication network of the vehicle C1 or may be measured for each predetermined zone.

(Packet Type)

The central control node 10A may execute the combination or switching of the wireless communication according to a type of a transmission packet (data). In a case where the transmission packet is a predetermined packet, the central control node 10A executes the combination or switching of the wireless communication. Examples of the predetermined packet includes a packet having specifically high QoS, such as that of the control system.

<5.2. Wireless Communication and Wired Communication are Independent>

For example, the wireless communication and the wired communication may be controlled independently of each other. Here, in "mutually independent" networks according to the present embodiment, each of the devices 30 and the nodes can be connected to both of the wireless communication network and the wired communication network, and can transmit and receive data via each of the networks. That is, even in a case where the networks according to the present embodiment are "mutually independent", the devices 30 and the nodes can access both the networks. That is, "independent" according to the present embodiment is different from "completely independent" in which the devices 30 and the nodes access only one network.

As described above, in the communication system 1, connection to the external network is performed with the central control node 10A or 10C. Thus, by preventing the central control node 10A or 10C from being connected to the wireless communication network in the vehicle, in other words, by performing connection to the external network by the wired communication and not performing connection to the external network by the wireless communication, it is possible to make robustness in the wireless communication of the in-vehicle LAN very high.

The method of making the wireless communication and the wired communication independent which method is described herein is suitable for the communication systems 1C, 1D, and 1G that perform the wireless communication without the wireless control node 10B described above.

Figure 11:
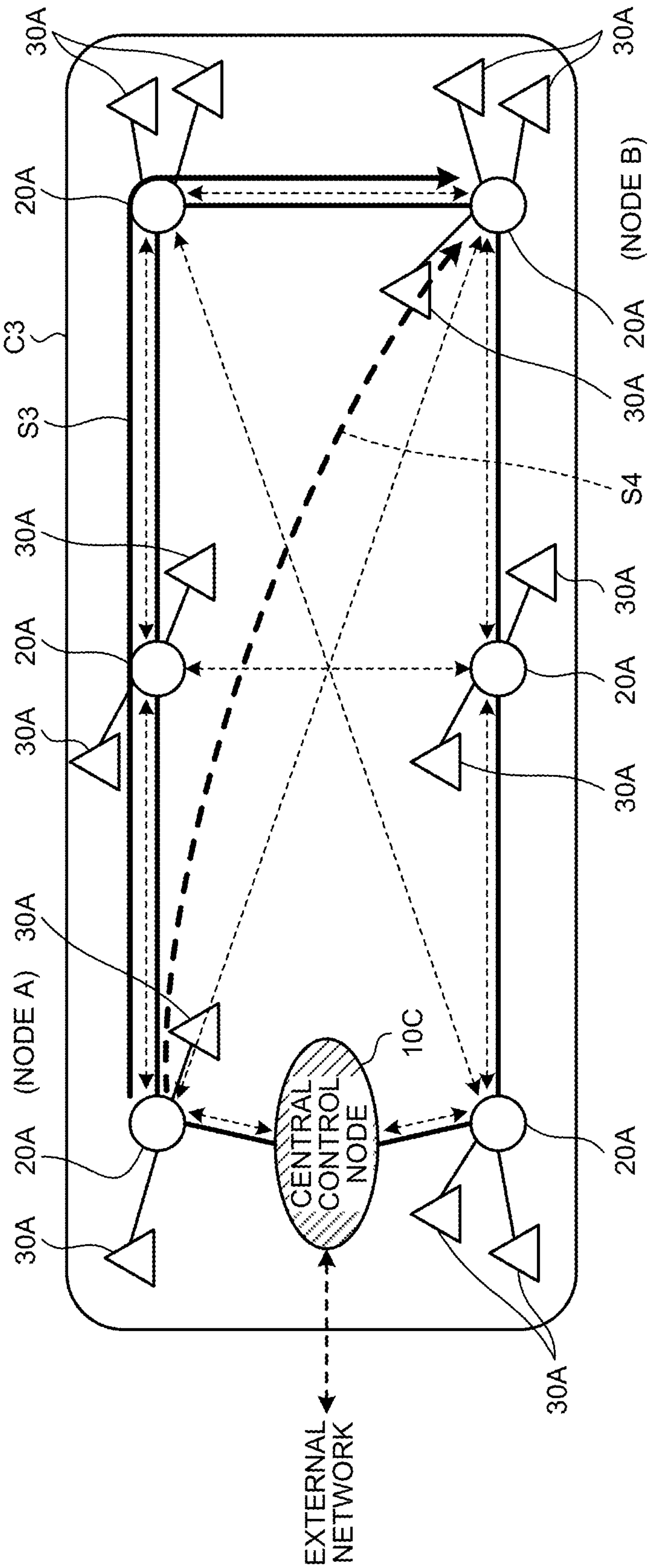
FIG. 11 is a view for describing an example of communication according to an embodiment of the present disclosure.

FIG. 11 is a view for describing an example of communication according to an embodiment of the present disclosure. Note that although the communication system 1C will be described as an example in FIG. 11, the other communication systems 1D, and 1G are in a similar manner. The wireless communication network and the wired communication network of the communication system 1C according to the present embodiment are independent of each other. Thus, control information for performing the wireless communication is configured in the wireless communication network, and control information for performing the wired communication is configured in the wired communication network. In addition, it is assumed that information for configuration of the control information is not shared between the wired communication network and the wireless communication network.

Here, it is assumed that data is transmitted from the upper left zone control node 20A (node A) in FIG. 11 to the lower right zone control node 20A (node B).

In this case, the node A may transmit the data by using both the wired communication network and the wireless communication network (see S3 and S4 in FIG. 11). Data to be transmitted in each network is controlled by the node A (that is, a transmission node) or the node B (that is, a reception node).

[Switching of Used Networks]

The node A or the node B (hereinafter, also referred to as a communication node) switches a communication mode to use at least one of the wired communication or the wireless communication according to a predetermined state such as a communication environment. Note that specific examples of the predetermined state and the communication switching are the same as those in the above-described case where the wireless communication and the wired communication are cooperated.

[Determination of a Transmission Parameter and a Transmission Method]

The communication node determines a transmission parameter and a transmission method related to data to be transmitted in at least one of the wired communication or the wireless communication. Details of processing of a case where the communication node transmits data by both the wired communication and the wireless communication and processing of a case where the communication node receives data by both the wired communication and the wireless communication will be described later.

[Combination/Switching of the Wireless Communication]

In addition, in a case where the communication is performed by utilization of the wired communication network, the communication node executes combination or switching with the wireless communication network according to a condition. Such combination or switching with the wireless communication network may be executed for each zone, or may be executed as communication in the entire vehicle C1. Note that a switching condition is the same as that in the above-described case where the wireless communication and the wired communication are cooperated.

6. COMMUNICATION PROCESSING

Next, communication processing of a case where data is transmitted by both the wired communication and the wireless communication will be described. A type of data to be a transmission object of both the wired communication and the wireless communication is not specifically limited, and all pieces of data are to be transmission objects.

<6.1. Transmission Processing>

First, processing of a case where data is transmitted by the wired communication and the wireless communication will be described. Such processing is executed, for example, in the transmission node (node A).

[Case where Transmission Data is the Same in Wired Communication and Wireless Communication]

(Transmission Timing)

The transmission node transmits the same transmission data by both the wired communication and the wireless communication. The transmission timing may be the same or different between the wired communication and the wireless communication.

For example, in a case where the transmission data is transmitted at different timings, the transmission node may transmit the transmission data by one of the wired communication or the wireless communication in a case where the transmission data is transmitted for the first time, and may transmit the transmission data by the other in a case of retransmission. The transmission node determines a network to be used for transmission of the transmission data, for example, according to an information amount and priority of the transmission data. For example, in a case where the information amount (data) of the transmission data is large, the transmission node first performs transmission by the wireless communication and performs the retransmission by the wired communication.

(Transmission Data)

The transmission node transmits first data and second data, each of which corresponds to one piece of transmission data, by the wireless communication and the wired communication, respectively. The first data and the second data may be the same data or different pieces of data.

That is, the transmission node transmits one piece of transmission data by the wired communication and the wireless communication.

Alternatively, the transmission node may generate first data to be transmitted by the wired communication by performing first transmission processing on one piece of transmission data, and generate second data to be transmitted by the wireless communication by performing second transmission processing on the transmission data.

Furthermore, the transmission node may set the transmission data as the first data and set the data generated on the basis of the transmission data as the second data. An example of such a case will be described with reference to FIG. 12.

(Error Correction Coding Processing)

Figure 12:
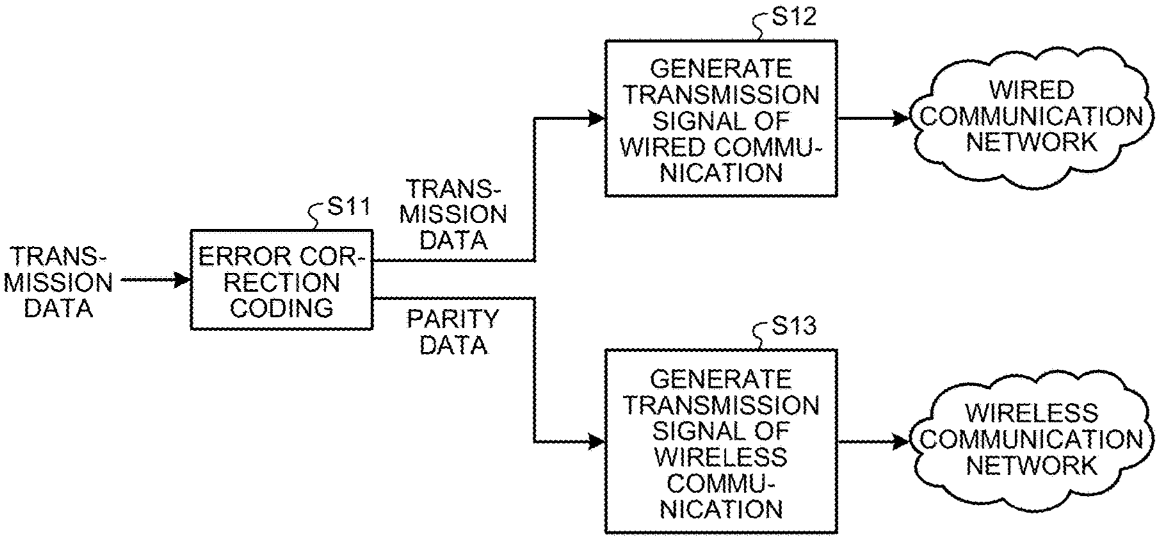
FIG. 12 is a view for describing an example of transmission processing according to an embodiment of the present disclosure.

FIG. 12 is a view for describing an example of transmission processing according to an embodiment of the present disclosure.

As illustrated in FIG. 12, first, the transmission node performs error correction coding processing on the transmission data (Step S11). Then, the transmission node performs signal processing on the transmission data, generates a transmission signal of the wired communication (Step S12), and performs transmission thereof to the reception node via the wired communication network.

In addition, the transmission node performs signal processing on parity data generated by the error correction coding processing and generates a transmission signal of the wireless communication (Step S13). The transmission node transmits the generated transmission signal to the reception node via the wireless communication network.

For example, the transmission node may transmit pieces of transmission data of different redundancy versions (RVs) in the 3GPP by the wired communication and the wireless communication, respectively.

As described above, since the transmission node transmits the transmission data and the parity data respectively in different networks, it is possible to more reliably transmit the transmission data and information for reducing an error rate of the transmission data. As a result, the communication system 1 can further improve reliability of the transmission data.

(Encryption Processing)

Although the transmission node performs the error correction coding processing on the transmission data in the above example, this is not a limitation. For example, the transmission node may perform encryption processing. This case will be described with reference to FIG. 13.

Figure 13:
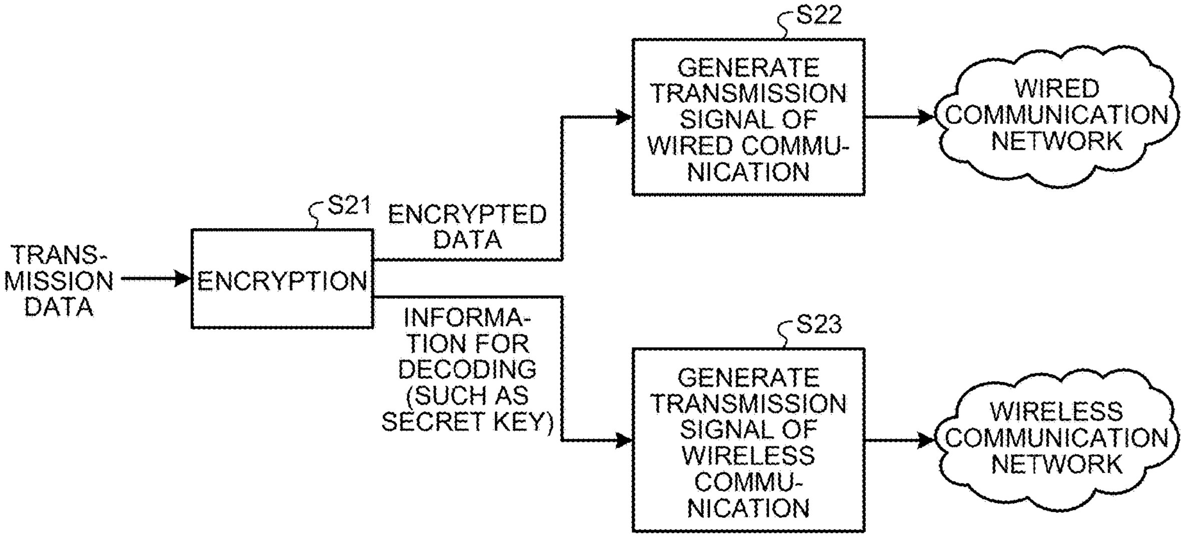
FIG. 13 is a view for describing another example of transmission processing according to an embodiment of the present disclosure.

FIG. 13 is a view for describing another example of transmission processing according to an embodiment of the present disclosure.

As illustrated in FIG. 13, first, the transmission node performs encryption processing on the transmission data (Step S21). Next, the transmission node performs signal processing on the encrypted transmission data (encrypted data), generates a transmission signal of the wired communication (Step S22), and performs transmission thereof to the reception node via the wired communication network.

In addition, the transmission node performs signal processing on information for decoding the encrypted data (for example, information such as a secret key) and generates a transmission signal of the wireless communication (Step S23). The transmission node transmits the generated transmission signal to the reception node via the wireless communication network.

In such a manner, the transmission node transmits the transmission data (such as the encrypted data) and information for determining whether the transmission data is correctly transmitted (information for decoding) respectively via different networks. As a result, the communication system 1 can further improve robustness and confidentiality of the system.

Note that the encryption processing performed by the transmission node may include, for example, encryption processing to which quantum cryptography or a blockchain technology is applied.

[Case where Pieces of Transmission Data are Different in Wired Communication and Wireless Communication]

Although the transmission node performs signal processing on one piece of transmission data and performs transmission thereof in different networks in the above-described example, this is not a limitation. The transmission node may transmit different pieces of transmission data in different networks. For example, according to a kind of the transmission data, the transmission node selects at least one of the wireless communication network or the wired communication network and transmits the transmission data.

For example, in a case of the zone architecture, communication of a plurality of kinds of data may be generated between zones in which ECUs are arranged. As described above, in the zone architecture, there is a possibility that a load of a transmission path between predetermined zones becomes temporarily high.

In this case, the transmission node selects a network according to, for example, a type of transmission data (such as QoS of the transmission data).

Figure 14:
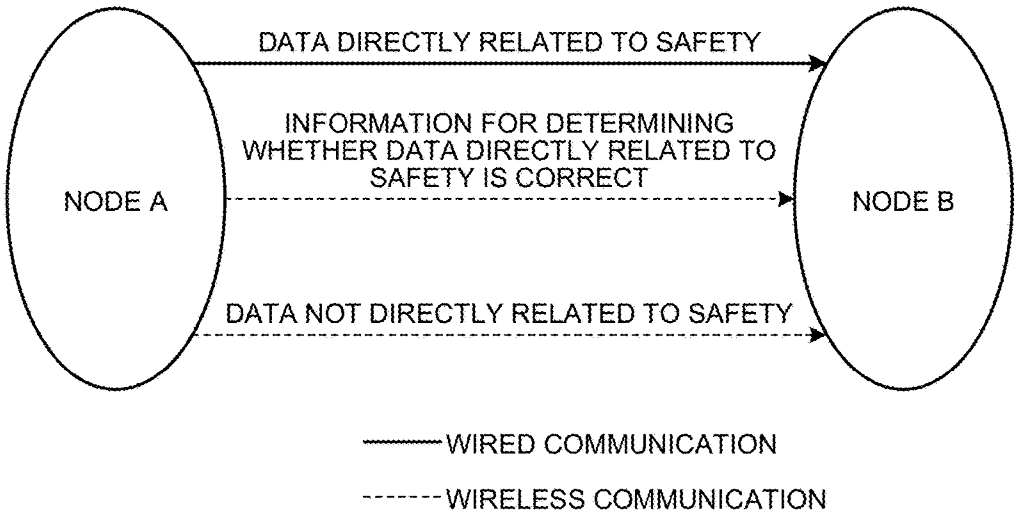
FIG. 14 is a view for describing selection of a network by a transmission node according to an embodiment of the present disclosure.

FIG. 14 is a view for describing selection of a network by the transmission node according to an embodiment of the present disclosure.

For example, the transmission node (node A) selects a network according to whether the transmission data is data directly related to safety (for example, QoS is very high). More specifically, the node A that is the transmission node transmits the data directly related to safety by using the wired communication. In addition, by using the wireless communication, the node A transmits information for determining whether the data directly related to safety is correctly transmitted. The node A transmits data not directly involved in safety by using the wireless communication.

Here, examples of the data directly related to safety include data of a control system and data notifying of a dangerous state. Furthermore, examples of the information for determining whether the data directly related to safety is correctly transmitted include information such as the parity data and secret key described above. Examples of the data not directly involved in safety include information related to audio or entertainment, information related to a device mounted on the vehicle C, such as an air conditioner, and the like.

In such a manner, the transmission node selects a network to be used according to a type of the transmission data. As a result, the communication system 1 can transmit data more reliably.

<6.2. Reception Processing>

Next, processing of a case where data is received by the wired communication and the wireless communication will be described. Such processing is executed, for example, in the reception node (node B).

(Error Correction Decoding Processing)

Figure 15:
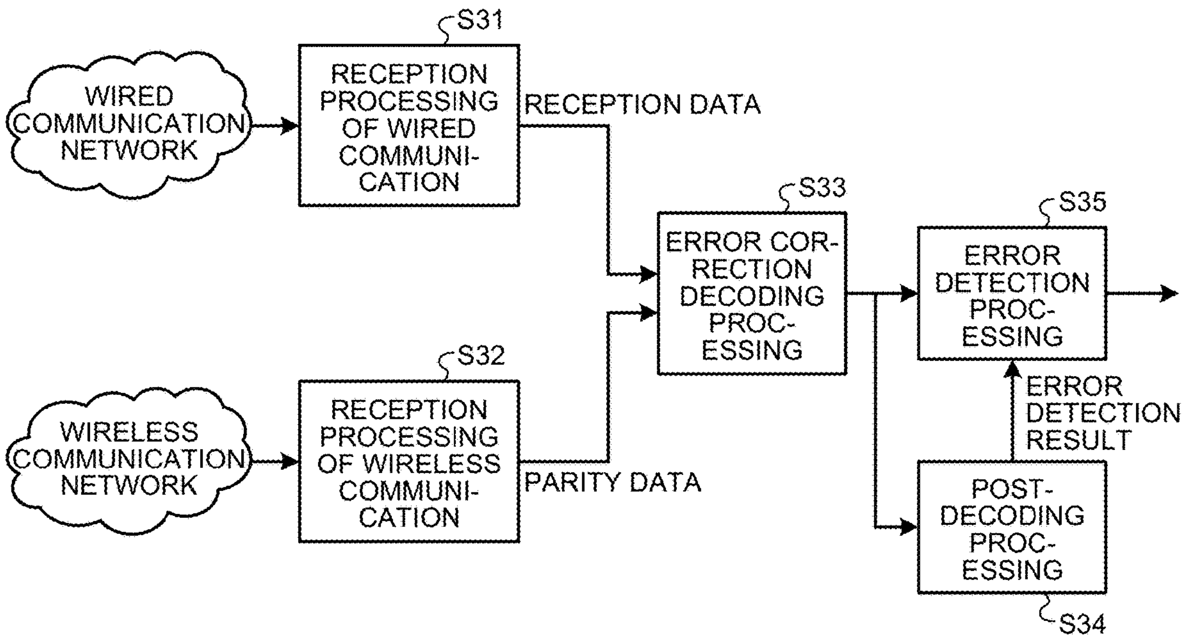
FIG. 15 is a view for describing an example of reception processing according to an embodiment of the present disclosure.

Reception processing by the reception node of a case where the transmission node transmits the transmission data and the parity data respectively in different networks as described above will be described. FIG. 15 is a view for describing an example of the reception processing according to an embodiment of the present disclosure.

As illustrated in FIG. 15, with respect to a reception signal received via the wired communication network, the reception node first performs reception processing in the wired communication (Step S31), and generates data. Furthermore, with respect to a reception signal received via the wireless communication network, the reception node performs reception processing in the wireless communication (Step S32), and generates parity data.

The reception node executes error correction decoding processing on the generated data by using the parity data (Step S33). The reception node performs error detection processing (Step S34).

Subsequently, the reception node performs post-decoding processing on the data, on which the error correction decoding processing is performed, by using an error detection result in the error detection processing (Step S35).

In such a manner, the reception node receives the reception data and the parity data via different networks, respectively. As a result, the communication system 1 can further improve reliability of the reception data.

(Decoding Processing of Encryption Processing)

Figure 16:
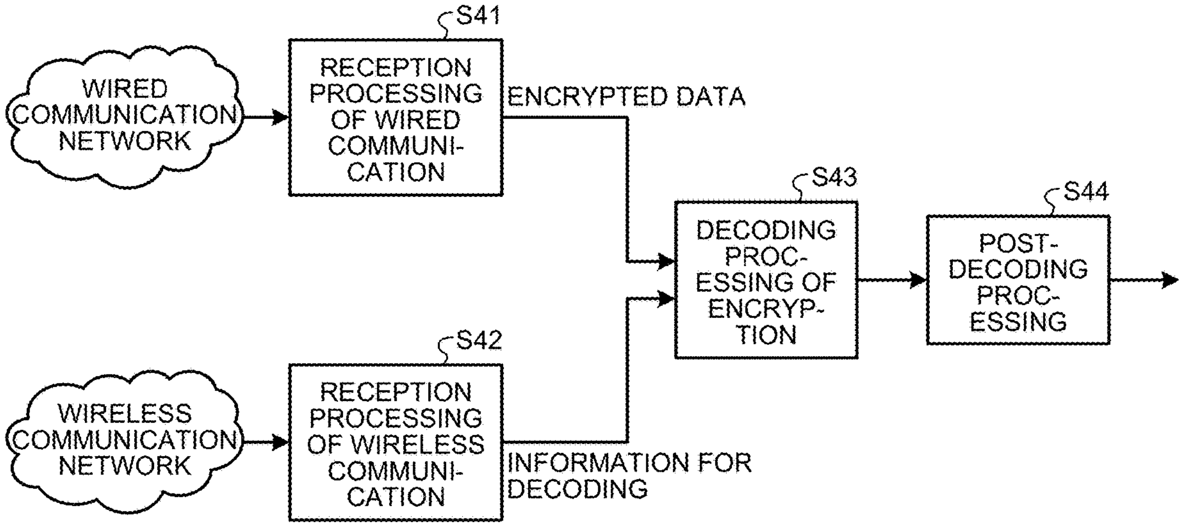
FIG. 16 is a view for describing another example of reception processing according to an embodiment of the present disclosure.

Reception processing by the reception node of a case where the transmission node transmits the encrypted data and information for decoding respectively in different networks as described above will be described. FIG. 16 is a view for describing another example of reception processing according to an embodiment of the present disclosure.

As illustrated in FIG. 16, with respect to a reception signal received via the wired communication network, the reception node first performs reception processing in the wired communication (Step S41), and generates encrypted data. Furthermore, with respect to a reception signal received via the wireless communication network, the reception node performs reception processing in the wireless communication (Step S42), and generates information for decoding (such as a secret key).

By using the information for decoding, the reception node executes, with respect to the generated encrypted data, decoding processing of encryption (Step S43). The reception node executes post-decoding processing on the decoded data (Step S44).

In such a manner, the reception node receives the encrypted data and the information for determining whether the encrypted data is correctly transmitted (information for decoding) respectively via different networks. As a result, the communication system 1 can further improve robustness and confidentiality of the system.

(Identical Data Reception Processing)

In a case where the transmission node receives pieces of identical transmission data respectively in both of the different networks, the reception node may preferentially perform the reception processing on the reception signal that is received first, for example.

For example, even when the transmission node transmits pieces of transmission data via the wired communication network and the wireless communication network at the same timing, timings at which the pieces of transmission data arrive at the reception node may be different due to a difference in a degree of congestion of the networks, a processing delay, and the like.

In such a case, the reception node performs the reception processing preferentially on a reception signal at an earlier reception timing, whereby communication with a lower delay can be realized. This is specifically suitable for data having a high demand for the low delay.

On the other hand, in a case where the transmission node receives pieces of identical transmission data respectively in both of the different networks, processing related to reception may be performed on a reception signal received via each of the networks and reception data may be generated. In this case, the reception node determines whether pieces of reception data are correctly received according to whether the pieces of reception data received respectively via the networks are the same.

As a result, the reception node can more reliably confirm whether data is correctly received, and the robustness and reliability of the communication system 1 can be further improved.

Note that the two kinds of reception processing may be performed simultaneously. For example, the reception node preferentially performs the reception processing on a reception signal received at an earlier timing, and first performs vehicle control or the like on the basis of the transmission data. Then, it is determined whether a reception signal received at a later timing is the same as the reception signal received at the earlier timing. In a case where the reception signal received at the later timing and the reception signal received at the earlier timing do not match, it is determined that there is a possibility that the data is falsified, and the vehicle control or the like that is performed first is stopped. By performing such reception processing, it is possible to achieve both the low delay and the high reliability.

(Processing of a Case where Reception Data is Correct)

Next, processing of a case where the reception node correctly receives the reception data will be described. In a case where the transmission node transmits pieces of identical transmission data respectively in both of the different networks as described above, the reception node determines that the data is correctly received in a case where the pieces of data received respectively via the networks are the same. In addition, in a case where an error (error) is not detected in the error correction decoding processing or in a case where data is not falsified in the decoding processing of the encryption, the reception node determines that the data is correctly received.

In this case, by transmitting Ack to the transmission node, the reception node notifies that the data reception is successful. Note that in a case where the wired communication is controlled by the central control node 10A or 10C, the transmission node may transmit Ack to the central control node 10A or 10C. Furthermore, in a case where the wireless control node 10B controls the wireless communication, the transmission node may transmit Ack to the wireless control node 10B. In such a manner, the reception node transmits Ack to at least one of the transmission node, the central control node 10A or 10C, or the wireless control node 10B.

(Processing of a Case where Reception Data is not Correct)

Next, processing of a case where the reception data is not correct will be described. In a case where the transmission node transmits the pieces of identical transmission data respectively in both of the different networks as described above, the reception node determines that the data is not correctly received in a case where the pieces of data received respectively via the networks are different. In addition, in a case where an error (error) is detected in the error correction decoding processing or in a case where it is determined that data is falsified in the decoding processing of the encryption, the reception node determines that the data is not correctly received.

In this case, by transmitting Nack to the transmission node, the reception node notifies that the data reception is failed. Note that in a case where the wired communication is controlled by the central control node 10A or 10C, the transmission node may transmit Nack to the central control node 10A or 10C. Furthermore, in a case where the wireless control node 10B controls the wireless communication, the transmission node may transmit Nack to the wireless control node 10B. In such a manner, the reception node transmits Nack to at least one of the transmission node, the central control node 10A or 10C, or the wireless control node 10B.

The reception node deletes the reception data determined to be incorrect. In addition, in a case where a predetermined condition is satisfied, for example, in a case where the reception data is data directly related to safety, such as information of a control system, the reception node starts safety stop processing of safely stopping the vehicle C. That is, the reception node shifts a state of the vehicle C to a fail-safe mode. Note that the safety stop processing may be started by the reception node, and may be started, for example, by the central control node 10A or 10C that receive notification from the reception node.

In addition, the predetermined condition is not limited to the example described above, and includes a case where data cannot be received even when retransmission is repeated a predetermined number of times or more, a case where correct data cannot be received due to unauthorized intrusion from the outside, and the like.

Note that in a case where the transmission node transmits the pieces of identical transmission data respectively in both of the different networks, and in a case where the pieces of data received respectively via the networks are different, the reception node may select, according to a predetermined method, the pieces of data received respectively via the networks.

For example, the reception node selects, as the reception data, data received by communication not connected to the external network, and deletes the data received by communication connected to the external network. For example, in the communication system 1 described above, the reception node deletes data received via the wired communication, and uses the data received via the wireless communication as reception data in processing in a subsequent stage.

As described above, since the reception node deletes the data received by the communication connected to the external network, the communication system 1 can further improve robustness.

Alternatively, the reception node may select the data received by the wired communication as the reception data, and delete the data received by the wireless communication. In general, the wired communication can perform more stable communication than the wireless communication. Thus, since the data received by the reception node by the wired communication is used as the reception data, the data received via a more stable communication path can be used for processing in the subsequent stage.

7. OTHER EMBODIMENTS

Although the control of the wired communication is performed by the central control node 10A or 10C and the control of the wireless communication is performed by the wireless control node 10B in the above-described embodiment, this is not a limitation. For example, the control of the wireless communication may be performed by the central control node 10A or 10C.

Furthermore, although any one of the zone control nodes 20A or the devices 30B performs the wireless communication in the above-described embodiment, this is not a limitation. Both the zone control nodes 20A and the devices 30B may perform the wireless communication. In addition, different devices may perform the wireless communication respectively for zones such as a zone in which the zone control nodes 20A perform the wireless communication and a zone in which the devices 30B perform the wireless communication.

8. CONCLUSION

Steps in the processing executed by each device in the present specification do not need to be processed in time series in the order described in the drawings. For example, steps in processing executed by each device may be processed in order different from the order described in the drawings, or may be processed in parallel.

In addition, it is also possible to create a computer program for causing hardware such as a CPU, a ROM, or a RAM built in each device to exhibit a function equivalent to the configuration of each device described above. Also, it is possible to provide a storage medium that stores the computer program. Furthermore, when each functional block illustrated in the functional block diagram is configured by hardware, a series of processing can be realized by hardware.

Preferred embodiments of the present disclosure have been described in detail in the above with reference to the accompanying drawings. However, a technical scope of the present disclosure is not limited to such examples. It is obvious that a person having ordinary knowledge in the technical field of the present disclosure can conceive various alterations or modifications within the scope of the technical idea described in the claims, and it should be understood that these alterations or modifications naturally belong to the technical scope of the present disclosure.

In addition, the effects described in the present specification are merely illustrative or exemplary, and are not restrictive. That is, in addition to the above effects or instead of the above effects, the technology according to the present disclosure can exhibit a different effect obvious to those skilled in the art from the description of the present specification.

Note that the present technology can also have the following configurations.

(1)

An in-vehicle communication device comprising:

a wired communication unit that performs wired communication via a wired communication network constructed between a plurality of pieces of equipment mounted on a vehicle;

a wireless communication unit that performs wireless communication via a wireless communication network constructed between the plurality of pieces of equipment; and a control unit that transmits first data via the wired communication unit and transmits second data via the wireless communication unit according to a predetermined condition.

(2)

The in-vehicle communication device according to (1), wherein the control unit switches, in a case where there is unauthorized access to one network of the wired communication network or the wireless communication network, communication via the one network to communication via another network.

(3)

The in-vehicle communication device according to (1) or (2), wherein the control unit transmits, in a case where a traffic amount of communication of one of the wired communication network or the wireless communication network exceeds or falls below a predetermined threshold, at least part of data while switching the communication.

(4)

The in-vehicle communication device according to any one of (1) to (3), wherein the first data and the second data are pieces of transmission data different from each other.

(5)

The in-vehicle communication device according to (4), wherein the control unit selects at least one communication unit of the wired communication unit or the wireless communication unit according to a type of the transmission data, and transmits the transmission data via the selected communication unit.

(6)

The in-vehicle communication device according to (5), wherein the control unit selects the communication unit according to whether the transmission data is information related to safety of the vehicle.

(7)

The in-vehicle communication device according to any one of (1) to (6), wherein the wired communication network of a ring type is constructed in the vehicle.

(8)

The in-vehicle communication device according to any one of (1) to (7), wherein topology of the wireless communication network is same as topology of the wired communication network.

(9)

The in-vehicle communication device according to any one of (1) to (7), wherein topology of the wireless communication network is different from topology of the wired communication network.

(10)

The in-vehicle communication device according to any one of (1) to (9), wherein the control unit performs at least one of the wired communication or the wireless communication on a basis of control information configured on a basis of information shared by the wired communication network and the wireless communication network.

(11)

The in-vehicle communication device according to any one of (1) to (9), wherein the control unit performs the wired communication on a basis of first control information configured in the wired communication network, and performs the wireless communication on a basis of second control information configured in the wireless communication network.

(12)

A communication method comprising:

performing wired communication via a wired communication network constructed between a plurality of pieces of equipment mounted on a vehicle;

performing wireless communication via a wireless communication network constructed between the plurality of pieces of equipment; and transmitting first data via the wired communication network and transmitting second data via the wireless communication network according to a predetermined condition.

(13)

A communication system comprising:

a zone control node arranged in each zone in a vehicle divided into a plurality of zones;

a control node that controls communication between the zone control nodes; and a device that is arranged in each of the zones and communicates with the zone control node corresponding to the zone, wherein at least one of the zone control nodes, the control node, or the devices includes a wired communication unit that performs wired communication via a wired communication network constructed between a plurality of pieces of equipment among the zone control nodes, the control node, and the devices mounted on the vehicle, a wireless communication unit that performs wireless communication via a wireless communication network constructed between the plurality of pieces of equipment, and a control unit that transmits first data via the wired communication unit and transmits second data via the wireless communication unit according to a predetermined condition.

REFERENCE SIGNS LIST

1A to 1G COMMUNICATION SYSTEM
10A, 10C CENTRAL CONTROL NODE
10B WIRELESS CONTROL NODE
20A, 20B ZONE CONTROL NODE
30A, 30B DEVICE
100 IN-VEHICLE COMMUNICATION DEVICE
110 ANTENNA UNIT
120 WIRELESS COMMUNICATION UNIT
130 NETWORK COMMUNICATION UNIT
140 STORAGE UNIT
150 CONTROL UNIT
C1 to C7 VEHICLE

The invention claimed is:

1. An in-vehicle communication device comprising:

a wired communication interface configured to perform wired communication via a wired communication network constructed between a plurality of pieces of equipment mounted on a vehicle;

a wireless communication interface configured to perform wireless communication via a wireless communication network constructed between the plurality of pieces of equipment; and circuitry configured to:

transmit first data via the wired communication interface and transmit second data via the wireless communication interface according to a predetermined condition;

transmit, in response to the predetermined condition, identical transmission data as both the first data via the wired communication interface and the second data via the wireless communication interface;

perform error correction coding processing on transmission data to generate parity data;

transmit the transmission data via one of the wired communication interface or the wireless communication interface; and transmit the parity data via another of the wired communication interface or the wireless communication interface.

2. The in-vehicle communication device according to claim 1, wherein the circuitry is configured to switch, in a case where there is unauthorized access to one network of the wired communication network or the wireless communication network, communication via the one network to communication via another network.

3. The in-vehicle communication device according to claim 1, wherein the circuitry is configured to transmit, in a case where a traffic amount of communication of one of the wired communication network or the wireless communication network exceeds or falls below a predetermined threshold, at least part of data while switching the communication.

4. The in-vehicle communication device according to claim 1, wherein the first data and the second data are pieces of transmission data different from each other.

5. The in-vehicle communication device according to claim 4, wherein the circuitry is configured to select at least one communication interface of the wired communication interface or the wireless communication interface according to a type of the transmission data, and transmit the transmission data via the selected communication interface.

6. The in-vehicle communication device according to claim 5, wherein the circuitry is configured to select the communication interface according to whether the transmission data is information related to safety of the vehicle.

7. The in-vehicle communication device according to claim 1, wherein the wired communication network of a ring type is constructed in the vehicle.

8. The in-vehicle communication device according to claim 1, wherein topology of the wireless communication network is same as topology of the wired communication network.

9. The in-vehicle communication device according to claim 1, wherein topology of the wireless communication network is different from topology of the wired communication network.

10. The in-vehicle communication device according to claim 1, wherein the circuitry is configured to perform at least one of the wired communication or the wireless communication on a basis of control information configured on a basis of information shared by the wired communication network and the wireless communication network.

11. The in-vehicle communication device according to claim 1, wherein the circuitry is configured to perform the wired communication on a basis of first control information configured in the wired communication network, and perform the wireless communication on a basis of second control information configured in the wireless communication network.

12. A communication method comprising:

performing wired communication via a wired communication network constructed between a plurality of pieces of equipment mounted on a vehicle;

performing wireless communication via a wireless communication network constructed between the plurality of pieces of equipment;

transmitting first data via the wired communication network and transmitting second data via the wireless communication network according to a predetermined condition;

transmitting, in response to the predetermined condition, identical transmission data as both the first data via the wired communication network and the second data via the wireless communication network;

performing error correction coding processing on transmission data to generate parity data;

transmitting the transmission data via one of the wired communication network or the wireless communication network; and transmitting the parity data via another of the wired communication network or the wireless communication network.

13. A communication system comprising:

a zone control node arranged in each zone in a vehicle divided into a plurality of zones;

a control node that controls communication between the zone control nodes; and a device that is arranged in each of the zones and communicates with the zone control node corresponding to the zone, wherein at least one of the zone control nodes, the control node, or the devices includes a wired communication interface configured to perform wired communication via a wired communication network constructed between a plurality of pieces of equipment among the zone control nodes, the control node, and the devices mounted on the vehicle, a wireless communication interface configured to perform wireless communication via a wireless communication network constructed between the plurality of pieces of equipment, and circuitry configured to:

transmit first data via the wired communication interface and transmit second data via the wireless communication interface according to a predetermined condition;

transmit, in response to the predetermined condition, identical transmission data as both the first data via the wired communication interface and the second data via the wireless communication interface;

perform error correction coding processing on transmission data to generate parity data;

transmit the transmission data via one of the wired communication interface or the wireless communication interface; and transmit the parity data via another of the wired communication interface or the wireless communication interface.

14. The in-vehicle communication device according to claim 1, wherein the circuitry is further configured to:

receive first reception data via the wired communication interface;

receive second reception data via the wireless communication interface; and determine whether the first reception data and the second reception data are correctly received based on whether the first reception data and the second reception data are the same.

15. The in-vehicle communication device according to claim 14, wherein the circuitry is further configured to shift a state of the vehicle to a fail-safe mode in a case where the first reception data and the second reception data are different.

16. The in-vehicle communication device according to claim 15, wherein the identical transmission data comprises data related to at least one of braking, steering, or acceleration of the vehicle, and the fail-safe mode includes at least one of limiting a speed of the vehicle, activating a hazard indicator, or generating an alert to a driver of the vehicle.

17. The in-vehicle communication device according to claim 14, wherein the identical transmission data comprises data related to safety of the vehicle, and the circuitry is configured to process the first reception data or the second reception data only when the first reception data and the second reception data are determined to be the same.

18. The in-vehicle communication device according to claim 1, wherein the predetermined condition comprises detection of at least one of unauthorized access to one of the wired communication network or the wireless communication network, or a traffic amount of one of the wired communication network or the wireless communication network exceeding a threshold, and the identical transmission data comprises data related to at least one of braking, steering, or acceleration of the vehicle.

19. The in-vehicle communication device according to claim 1, wherein the circuitry is further configured to:

receive, at a destination device, first reception data corresponding to the identical transmission data via the wired communication interface;

receive, at the destination device, second reception data corresponding to the identical transmission data via the wireless communication interface;

compare the first reception data and the second reception data; and execute a vehicle control operation based on the first reception data or the second reception data only when the first reception data and the second reception data match.

* * * * *